(12) United States Patent
Lasser

(10) Patent No.: US 6,883,114 B2
(45) Date of Patent: Apr. 19, 2005

(54) BLOCK DEVICE DRIVER ENABLING A RUGGEDIZED FILE SYSTEM

(75) Inventor: Menahem Lasser, Kohav-Yazr (IL)

(73) Assignee: M-Systems Flash Disk Pioneers Ltd., Kfar Saba (IL)

( * ) Notice: Subject to any disclaimer, the term of this patent is extended or adjusted under 35 U.S.C. 154(b) by 561 days.

(21) Appl. No.: 09/986,330

(22) Filed: Nov. 8, 2001

(65) Prior Publication Data

US 2003/0088812 A1 May 8, 2003

(51) Int. Cl.$^7$ ............................................. G06F 11/00
(52) U.S. Cl. ............................................. 714/19; 714/15
(58) Field of Search ............................... 714/15, 19, 20; 707/202; 711/161

(56) References Cited

U.S. PATENT DOCUMENTS

| | | | | |
|---|---|---|---|---|
| 5,712,971 A | * | 1/1998 | Stanfill et al. | 714/34 |
| 5,778,168 A | * | 7/1998 | Fuller | 714/18 |
| 5,802,364 A | * | 9/1998 | Senator et al. | 719/325 |
| 5,819,292 A | | 10/1998 | Hitz et al. | |
| 5,857,204 A | * | 1/1999 | Lordi et al. | 707/202 |
| 5,878,428 A | * | 3/1999 | Copeland et al. | 707/103 R |
| 5,931,954 A | * | 8/1999 | Hoshina et al. | 714/15 |
| 5,937,425 A | | 8/1999 | Ban | |
| 5,963,962 A | | 10/1999 | Hitz et al. | |
| 6,016,553 A | | 1/2000 | Schneider et al. | |
| 6,199,178 B1 | | 3/2001 | Schneider et al. | |
| 6,240,527 B1 | | 5/2001 | Schneider et al. | |
| 6,282,605 B1 | * | 8/2001 | Moore | 711/103 |
| 6,332,200 B1 | * | 12/2001 | Meth et al. | 714/16 |

\* cited by examiner

*Primary Examiner*—Nadeem Iqbal
*Assistant Examiner*—Gabriel L. Chu
(74) *Attorney, Agent, or Firm*—Mark M. Friedman

(57) ABSTRACT

A ruggedized file system, which provides ruggedness to non-volatile storage media at the device driver level. The ruggedized block device driver implementation provides ruggedness at the device driver level, thereby allowing atomic sequences of operations by the file system. Accordingly, the device driver is told that the current data state is a "fall-back" consistent state, into which the system should wake up if interrupted prior to completion of the sequence, following which operations are executed as required by the file system, including erasing, writing or overwriting blocks. The device driver is further told when the atomic sequence is complete, such that a new consistent state is thereby defined. It is, accordingly, the responsibility of the device driver to ensure that either the sequence completes and the file system reaches the target consistent state, or if power is lost or any other failure occurs in the middle, the file system will wake up in the initial fall-back state. Except for activating this "atomicity" feature as described above, the file system does not have to be aware of any implementation detail of the ruggedness solution.

61 Claims, 26 Drawing Sheets

BLOCK DEVICE DRIVER ENABLING A RUGGEDIZED FILE SYSTEM

BACKGROUND OF THE INVENTION

1. Field of the Invention

The present invention relates to a system and method for improving the reliability of storing data on non-volatile memory devices.

2. Description of the Related Art

Almost all computer systems, whether large mainframes or tiny embedded micro controllers, need to store data such that it shall not be lost when the system is powered down. Therefore those computers usually include some kind of Non Volatile Memory (NVM), in addition to any volatile memory they may use for running their programs. The NVM may be a magnetic disk, a flash memory chip, or any other non-volatile storage element.

Figure 1:
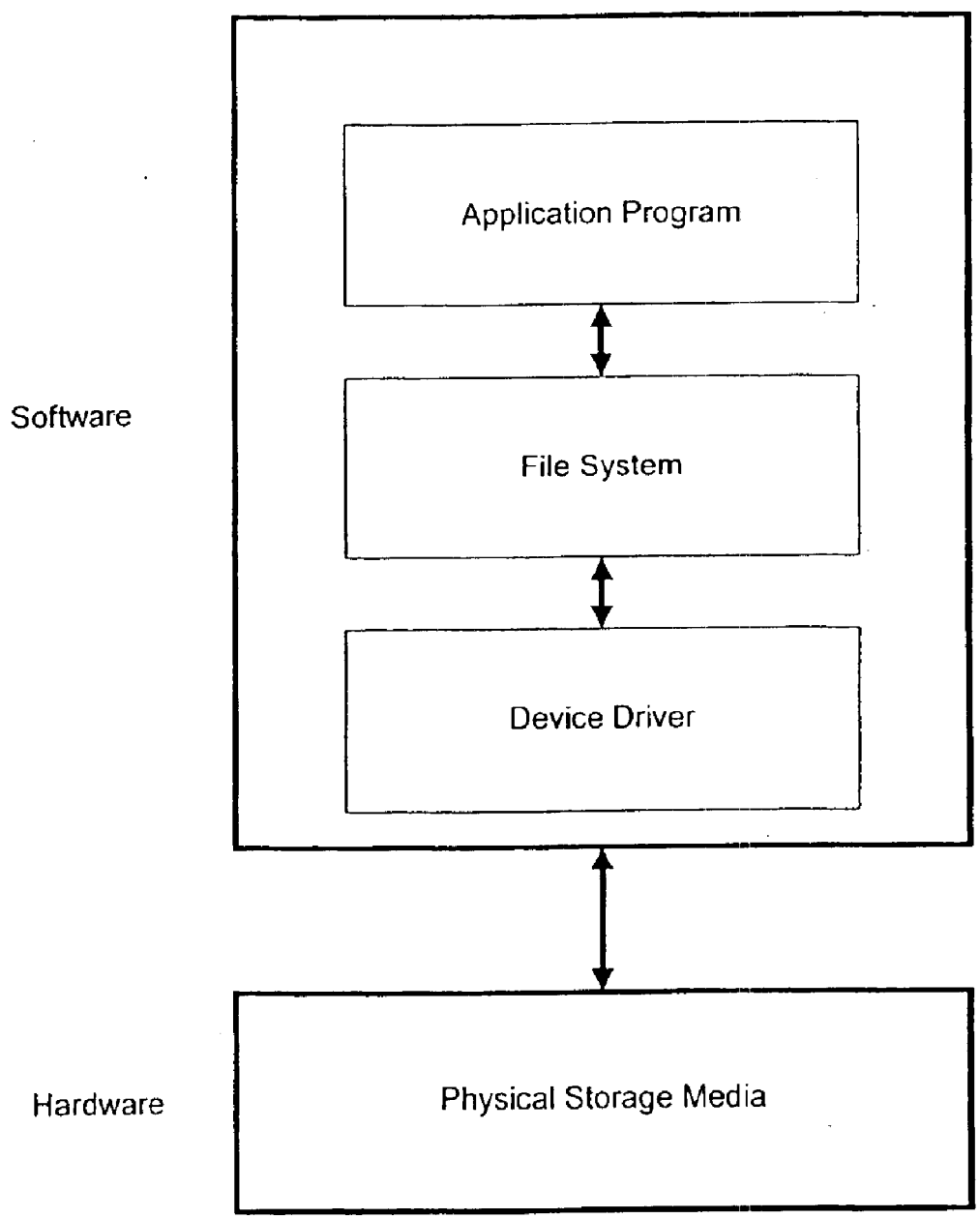

FIG. 1 shows the general structure of accessing each such storage device. At the bottom of the figure, we see the physical storage media 10, which is the hardware layer implementing the physical storage. As each storage device may have its own unique interface and peculiarities which make it very inconvenient to work with, it is the common practice to have a software device driver included in the operating system running on the computer (or running on the bare hardware, if no operating system is used), with this driver providing a simplified and standardized interface for other software components wishing to access the device. For storage devices used for storing files (i.e. disks, diskettes, etc.), but not only for them, the interface provided by their device drivers is usually of the type known as "block device driver". Such device drivers interact with their clients using blocks of data rather than single bytes. This applies to both input and output operations, that is, to both reading and writing. The most common example for a block device is the magnetic disk, whose hardware interface is commonly configured for transferring only complete blocks (usually called "sectors" in this context), such as 512 bytes or more. It should be emphasized that it is not necessary for the physical storage device to be physically limited to block operations in order to have a device driver presenting a block device interface. For example, a battery-backed RAM disk is not physically limited to blocks and may physically read and write each of its memory bytes. Still, typically its device driver presents a block device interface to the rest of the system, so as to be compatible and interchangeable with magnetic disks. Therefore, for the purpose of the present invention, a block device is any device whose driver presents a block device interface, regardless of its actual physical structure.

Figure 2:
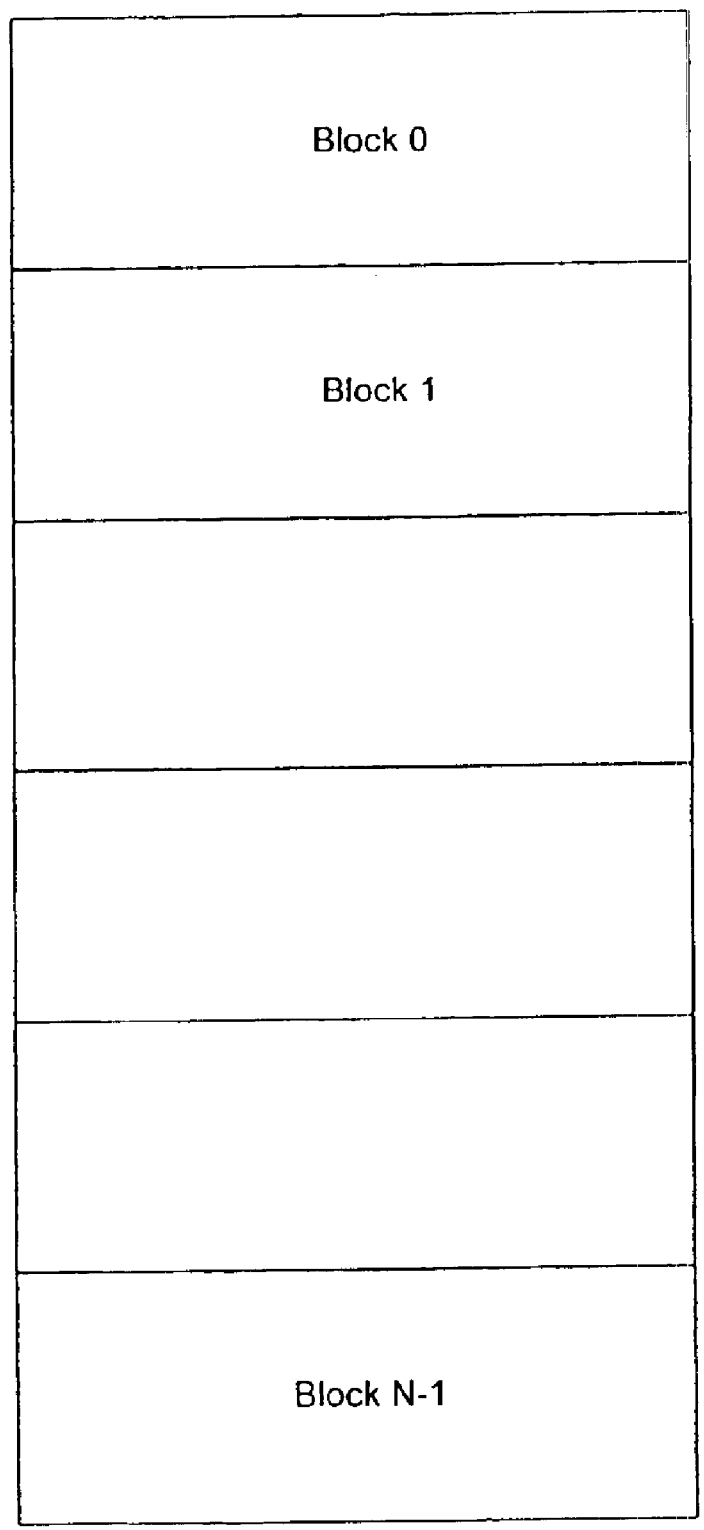

A block device seems to its users as a linear array of blocks of a certain fixed size. Each one of this blocks can be read or written independently of the other blocks using its index in the array, as shown in FIG. 2. The common practice (which is also used here) is to number the blocks starting from block number 0 (21), and ending in block number (N−1) 22, where N is the number of blocks exported by the device driver. Again it should be emphasized that this linear array structure does not necessarily exist at the physical device level. For example, a flash disk block device driver also presents this linear array image, but internally the physical blocks on the media are usually scattered in a random order (such that block number 0 may physically be located in the middle or the end) due to the writing limitations in flash memory and the possible existence of bad blocks. It should also be understood that the block device driver has no knowledge of the contents put into its blocks by the upper software layers.

Referring back to FIG. 1, we see there is usually a File System (FS) software layer on top of the device driver. A FS is a software component which provides further insulation from the physical device, by enabling the application programs to interact with the storage device using only the concept of files, a concept which is much more natural and convenient to the typical programmer or user. The FS achieves this abstraction by organizing the user data on the block device into some logical structure, and associating the blocks containing a file's data with the file's attributes (i.e. file name, creation time, access permissions, etc.). For that purpose the FS stores into the device meta-data, which is not directly visible to the user, and contains the FS internal book-keeping information with which it is able to trace and access the user files. For example, the Microsoft DOS FAT12 file system, which is one of the simplest FS commercially available, stores on the storage device a boot sector containing some basic parameters, allowing the location of the other meta-data structures (must be in first device block), one or more copies of the File Allocation Table (FAT), which is the allocation map of the device, and a root directory structure for locating files by name. The application programs interact with the FS on the file-level, by issuing commands such as "open file", "delete file", "write file", etc., being completely ignorant of the underlying block structure. There are many file systems in use today, greatly differing in their internal structures and characteristics. In many cases (such as with the Linux operating system) an operating system even provides several file systems to its users and they may choose the one most suitable for their needs.

A FS may or may not be "ruggedized". For the purpose of this invention, a ruggedized software component is defined as any component having the capability of staying in a certain known consistent state (for file systems and device drivers, "state" refers to data contents of the storage device) until a sequence of operations is completed and a new known consistent state is reached. A ruggedized component guarantees that any interruption (such as a sudden power-loss) before reaching the new consistent state will cause a "roll-back" of the operations which occurred after the previous consistent state, leaving the component in this first state. In other words, a user session may end in a new consistent state or in a previous consistent state, but never in between. In still other words, a ruggedized component is a component that can survive any sudden power loss without losing its consistency, always waking up into a consistent state.

In non-ruggedized systems, a power loss occurring in the middle of any FS operation may easily destroy the FS consistency, unless special measures are taken to protect against this. The loss of consistency can occur at two levels:

a. Inconsistency at the block device level—Let us assume the FS issues a command to the device driver to overwrite an existing block with new data. The block write operation of that driver might not be atomic. That is, it might be the case that a power loss in the middle of writing the block will leave the block half written, with part of it containing old data and part of it containing new data. Both fully old or fully new data are considered to be consistent states, but the mix of the two is not consistent, as it leaves the FS in a state which is neither the old one (before the write) nor the new one (after a successful write).

Methods for solving this type of inconsistency are well known in the prior art, and are not part of the present invention. For example, M-Systems Flash Disk Pioneers Ltd. TrueFFS driver for its DiskOnChip family of products offers its users protection against such inconsistencies at the block device level.

b. Inconsistency at the FS level—Let us assume that the user issues a command to the FS to write a new file. Because of the need of the FS to update its own meta-data to reflect the change, the FS will most probably have to issue to the device driver several commands—a first one to actually write the new data, a second one to update the allocation map, and a third one to update the corresponding directory entry. In many file systems there might be even more commands, such as for updating backup copies of the FS structures. This sequence of calls is not atomic even if each single call is. That is, it might be possible that a power loss within the sequence of calls will enable only a few of them to be completed, while others will not take place. For example, the file might actually be written into the device, but its directory entry may not be written, so that it might now be impossible to locate it. A more severe danger occurs when overwriting an existing file with new contents, where it might happen that the previous contents are already lost while the new contents have not yet been written, a situation which is highly undesirable. An even more severe danger occurs when the integrity of the FS structures themselves are damaged, as we might even lose the whole device contents if the FS designer did not anticipate such cases. It is this type of inconsistency which is the object of the present invention.

As there are many systems in which losing the FS consistency is unacceptable, there have been many attempts to find defenses against power loss inconsistencies, or in other words—to provide ruggedized file systems. Traditional solutions have been to have the system from time to time copy the FS or portions of it into an offline media such as backup tape. If a failure occurs, the FS can be retrieved from the backup copy into a consistent state. This method usually requires manual intervention and/or bringing the whole system offline when making the backup or restoring from it. A better solution was implemented by some file systems (for example the Episode file system disclosed in USENIX, Winter 1992, pages 43–59), which do not backup the whole device contents but rather only the meta-data of the FS, and can do it online without halting system operation and without using offline storage, just some additional storage space on the protected device. An even more efficient solution is disclosed by Hitz et al in U.S. Pat. Nos. 5,819,292 and 5,963,962. The methods of these patents allow achieving the same result without having to duplicate all meta-data of the FS. Those methods are described in great detail in the patents in the context of a FS called "Write Anywhere File-system Layout" (WAFL), and are quite efficient in achieving the goal of having a ruggedized FS with a relatively low penalty in storage space and performance.

However, all methods known in the prior art for achieving file system ruggedness are based on implementing special data structures and algorithms at the file system level. For example, the Hitz et al methods require the implementation of special "snapshot" bits per each block entry in the FS allocation table (called "blkmap" there), and also require changing the logic of file deletion, so that blocks used for storing the file are not necessarily cleared, as they might still be needed for a previous "snapshot". The disadvantages resulting from this are:

a. A ruggedized FS is currently always a specially designed one, having unique algorithms and data structures. Thus a user requiring the ruggedness property has no choice but to stay with that FS, even if another FS better suits his/her needs in other respects. Making this other preferred FS ruggedized will typically require a total redesign of its internal workings, something which is usually not practical.

b. Because of the unique meta-data structures employed by prior art ruggedized FS, there might be no compatibility with any non-ruggedized FS, in the sense that if a storage device is moved from a system with the ruggedized FS into a system with a non-ruggedized FS or vice versa, the device contents might be interpreted differently, or even not be readable at all. Such compatibility is highly desired as in many cases storage devices which must operate under ruggedized conditions have to be set-up or maintained on factory-level development systems which have no need for ruggedness and consequently do not support it.

c. Prior art ruggedized file systems typically employ their special algorithms all the time. As there is always some penalty in space and performance when using a ruggedized FS, it might happen that an application will sometimes prefer to give up ruggedness for certain operations or for certain periods of time. As such an option is typically not available, an application requiring ruggedness only for a short period of time must pay the penalty all the time.

There is thus a widely recognized need for, and it would be highly advantageous to have, a ruggedized File System that is not limited by requiring special design, unique meta-data structures and special algorithms.

SUMMARY OF THE PRESENT INVENTION

According to the present invention there is provided a ruggedized file system, which provides ruggedness to the file system at the device driver level.

The present invention overcomes all the above listed disadvantages of prior art ruggedized file systems by solving the problem on a different level. Instead of being provided on the file system level, the ruggedness is provided at the device driver level. Thus any operation that the FS wants to become atomic (i.e. the "write new file" command described above), is executed by the FS in the following manner:

a. Tell the device driver that the current state is a "fallback" state, into which the system should wake up if interrupted prior to completion of the sequence.

b. Do any operations required by the FS, including erasing, writing or overwriting blocks.

c. Tell the device driver that the atomic sequence is complete, and that a new consistent state is hereby defined.

It is, accordingly, the responsibility of the device driver to ensure that either the sequence completes and the FS reaches the target consistent state, or (if power is lost or any other failure occurs in the middle) the FS will wake up in the initial fallback state. Except for activating this "atomicity" feature as described above, the FS does not have to be aware of any implementation detail of the ruggedness solution. This novel approach enables the improvement on all the disadvantages listed above:

a. Any FS running on top of the ruggedized device driver can utilize its ruggedness capability, regardless of its unique structures and algorithms. There is no longer a need for specially designed ruggedized file systems.

The only adaptation that should take place in the file system code is the insertion of the "atomicity" calls described above, around the sequences of driver calls to be "atomized".

b. More than that, if the adaptation of the FS in use is either impossible or not desired, the ruggedness can even be achieved at the application level by the insertion of the "atomicity" calls described above around the calls to the FS that are to be "atomized".

c. As will be readily understood from the description of the methods of the present invention, a FS utilizing these methods can be made compatible with the non-ruggedized FS from which it was adapted, so that exchanging storage devices between the two file systems is made possible.

d. The methods of the present invention allow the dynamic activation of the "atomicity" feature according to changing needs. The ruggedized driver makes it possible for the FS to switch the ruggedness feature on and off, so that it does not have to be used when it is not required, thus avoiding paying the unnecessary storage space and the performance penalties. An FS implementation may add an option to the FS interface, enabling a user application to dynamically switch the feature on and off.

DRAWINGS

The invention is herein described, by way of example only, with reference to the accompanying drawings, wherein:

FIG. 1—General Structure of Access to Storage Media

FIG. 2—A Block Device of Size N Blocks

Figure 3:
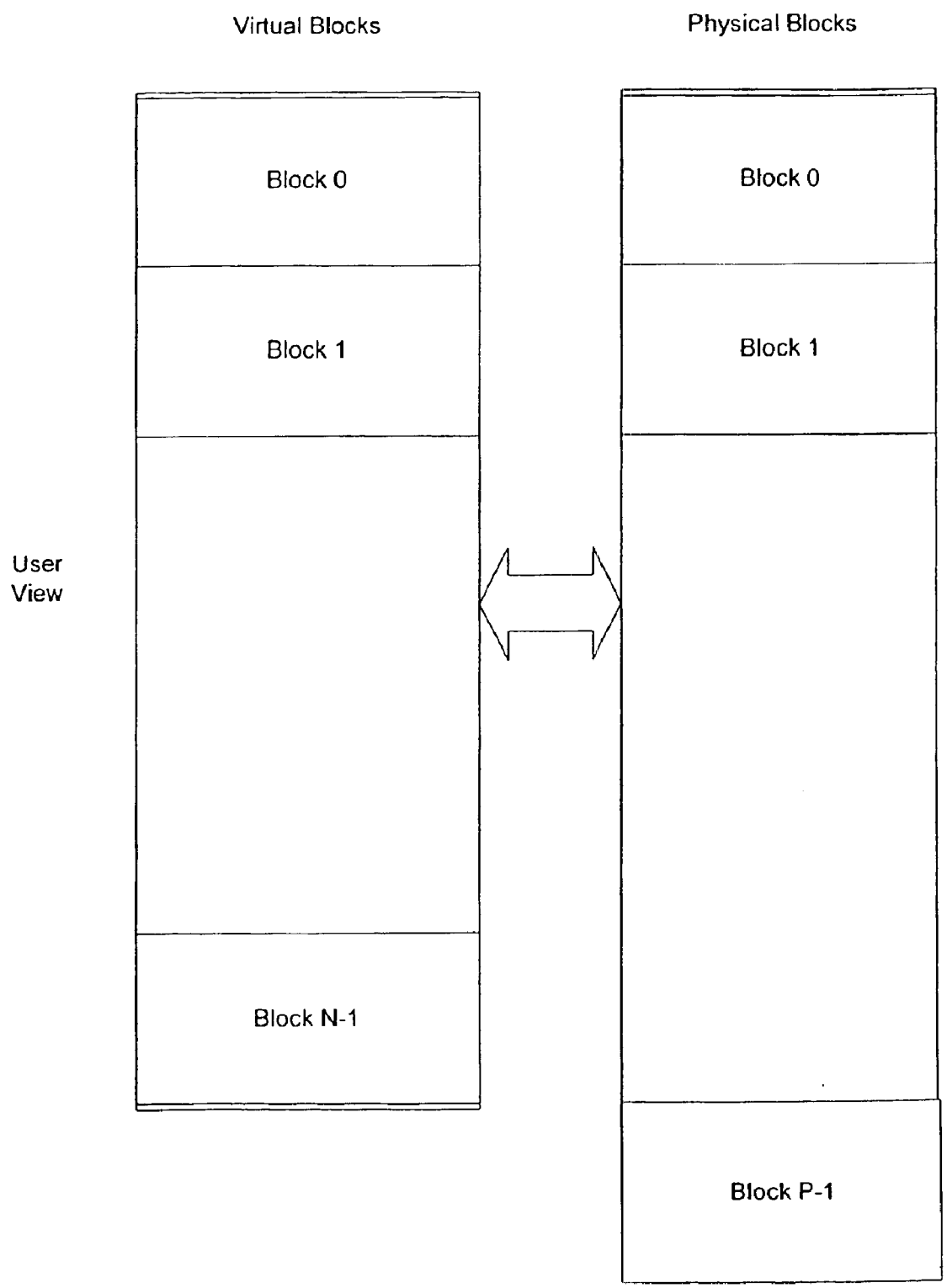

FIG. 3—Device Driver Storage Organization (First Embodiment)

FIGS. 4A to 4E—Sequence of Events While Moving Between Consistent States (First Embodiment)

Figure 5:
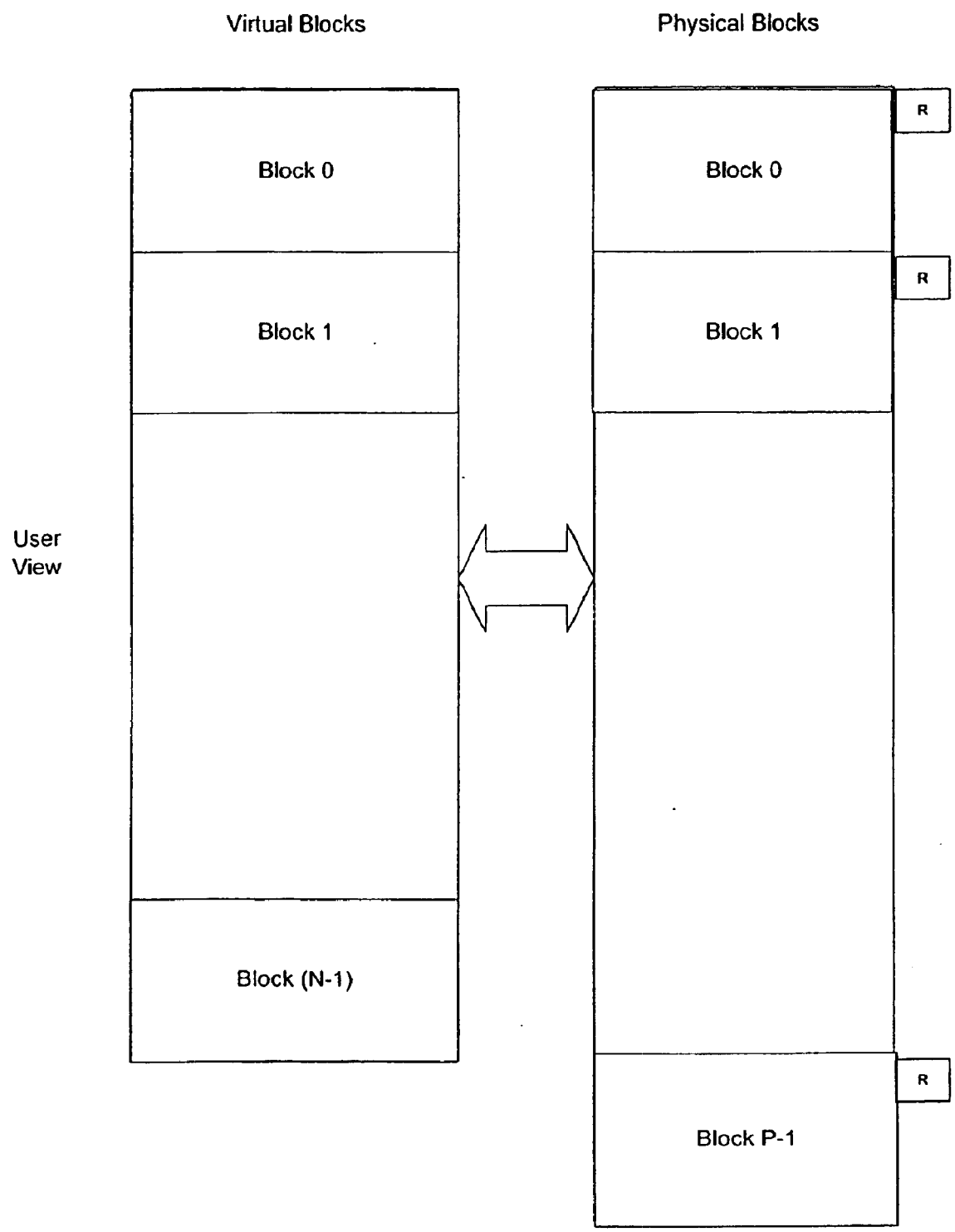

FIG. 5—Device Driver Storage Organization (Second Embodiment)

FIGS. 6A to 6E—Sequence of Events While Moving Between Consistent States (Second Embodiment)

Figure 7:
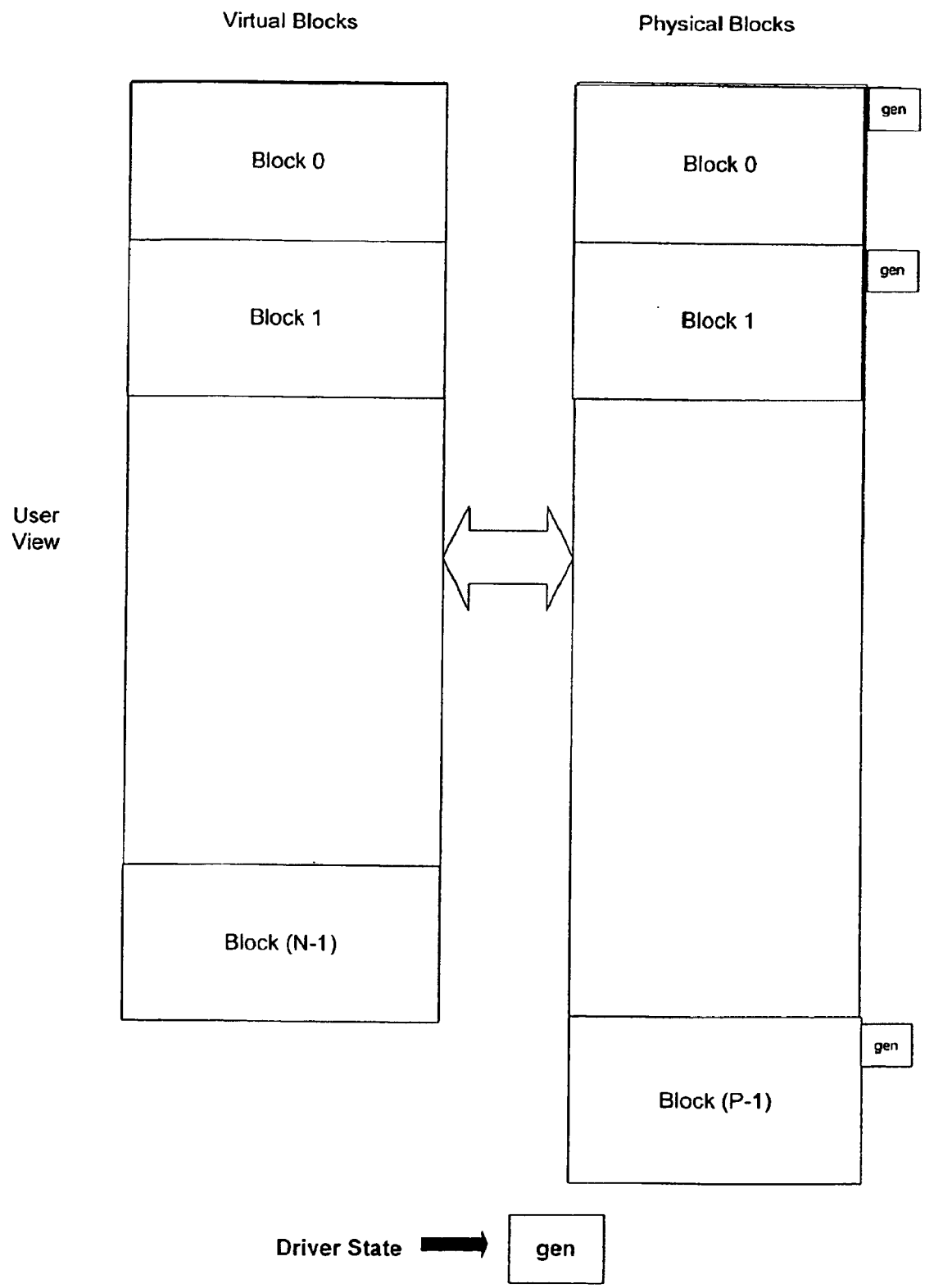

FIG. 7—Device Driver Storage Organization (Third Embodiment)

FIGS. 8A to 8E—Sequence of Events While Moving Between Consistent States (Third Embodiment)

Figure 9:
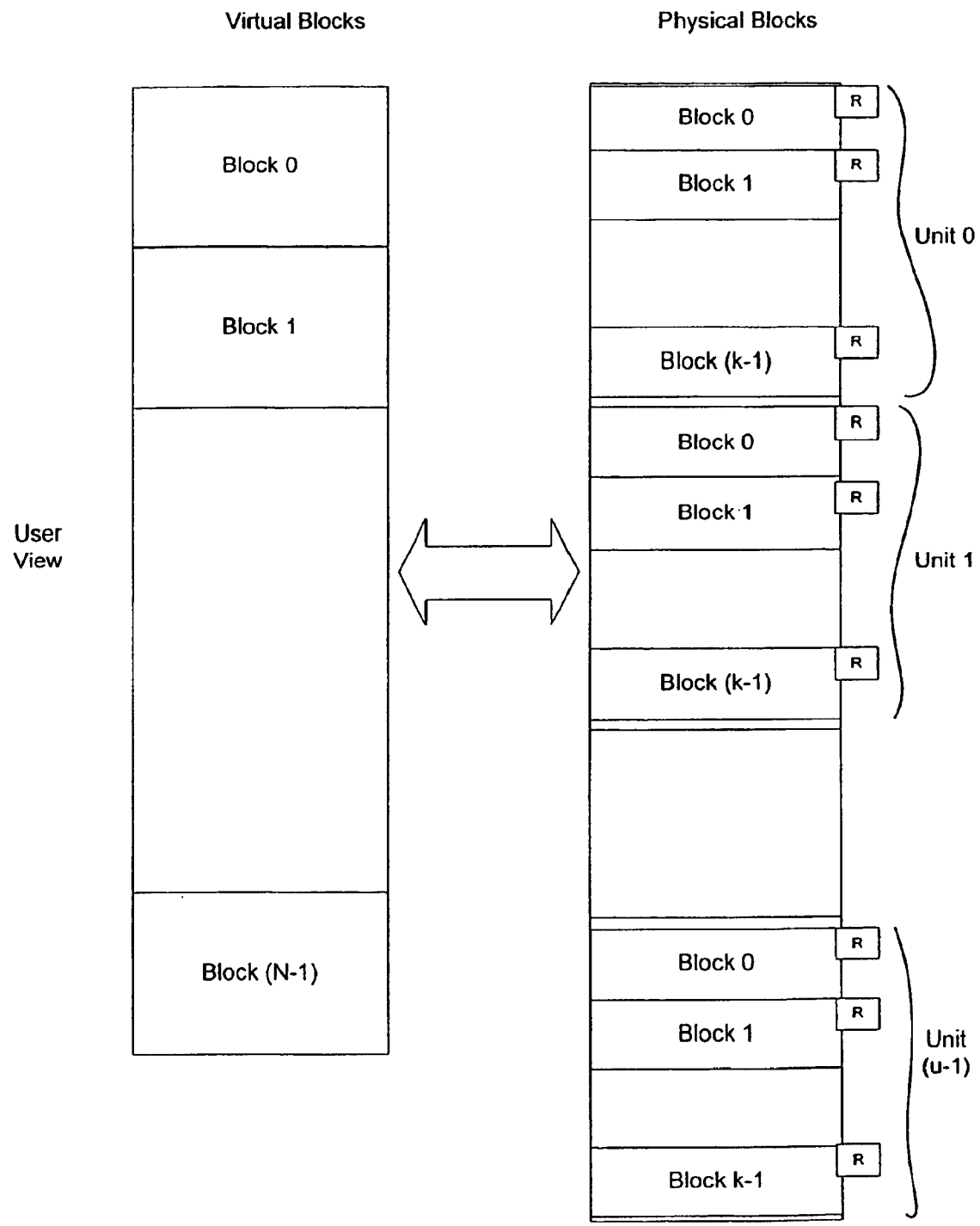

FIG. 9—Device Driver Storage Organization for Unit-Based Media

FIGS. 10A to 10E—Sequence of Events While Moving Between Consistent States (Unit-Based Media)

DESCRIPTION OF THE PREFERRED EMBODIMENT

The present invention relates to an improved means of providing a ruggedized file system.

The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Specifically, the present invention can be used to provides ruggedness to a file system at the device driver level The principles and operation of a system and a method according to the present invention may be better understood with reference to the drawings and the accompanying descriptions, it being understood that these drawings are given for illustrative purposes only and are not meant to be limiting. The following description provides detailed examples of several solutions disclosed in the present invention. It should be clear that the implementations details shown here are only meant as examples and there are many more ways in which the methods of the invention can be implemented. Furthermore, the distinctions between the different solutions presented here are somewhat arbitrary, as it is also possible to construct combinations of those solutions, which combine methods from more than one of the explicitly presented ones. Therefore the description below is not meant to limit or narrow in any way the claims included in this invention. In the forthcoming explanations it is first assumed that a block is the unit of storage that can be used for all physical media operations (read, write, erase, allocate). In addition, there is also presented below a more general case where this assumption is not necessarily true. All solutions, accordingly, are based on the common concepts of "virtual blocks", "physical blocks" and "blocks chain". FIG. 3 shows the internal storage organization of a device driver using the methods of the present invention. First, we note a distinction between physical blocks and virtual blocks. What the driver's user interacts with are the virtual blocks 31, and the user perceives the storage device as having a certain number of them (N in the case of FIG. 3). Internally the media contains a larger number of physical blocks 32 (P in the case of FIG. 3). This distinction between virtual and physical blocks is quite well known in the prior art, and is not an innovation of the present invention. Many flash memory disk management systems are based on such an arrangement, as can be seen, for example, in U.S. Pat. No. 5,937,425. However, in flash disks the need for such an arrangement is the result of the unique features of flash memory, such as the inability to write over an already written block without first erasing it, or the existence of bad blocks in the physical media. In our case, the need for such arrangement comes from the methods of the present invention, and therefore, a device driver that utilizes the present invention must employ this structure even if it does not need it for other reasons.

It should be noted about the relation between N (number of virtual blocks) and P (number of physical blocks), that it must always be the case that P>N, that is—the number of physical blocks must be larger than the number of virtual blocks. This should be easy to understand, since in a regular driver (i.e. non-ruggedized) we may allocate exactly one physical block for each virtual block, but in a ruggedized driver this is theoretically impossible. After telling the driver that a certain state is the current fall-back state, and then overwriting a block with new data, we must keep both the old data (in case we have to fall back to the previous state) and the new data (in case the sequence completes successfully) on the media. This means that some physical blocks must be set aside to contain these alternative copies, and this implies we must have more physical blocks than virtual ones. The number of extra physical blocks available in excess of the number of exported virtual blocks can be fixed at the time of system generation (i.e. when formatting the device) or can be dynamically changed during operation. Setting the number to a large value has the advantage of allowing a large amount of new data to be accepted by the driver before having to commit to a new fall-back state, but has the disadvantage of reducing the number of virtual blocks that can be exported, thus reducing the logical size of the storage device. Setting the number to a small value increases the logical storage size but limits the amount of write operations between successive fall-back states.

It should also be noted that the methods of the present invention do not impose any specific type of mapping between virtual and physical blocks. For example an implementation may assign the first N physical blocks to match the N virtual blocks with a straight-forward one-to-one mapping, with the last (P–N) physical blocks serving as extra blocks for the alternative copies. Another implementation may create a fully random mapping, where any physical block may be assigned to any virtual block.

The methods of the present invention require a virtual block to possibly be mapped to more than one physical block. The group of physical blocks corresponding to the same virtual block is called "blocks chain" or simply "chain" in the current description. A chain is an ordered set of blocks, meaning that it is possible to determine the order in which the individual blocks were put into the chain. The methods of the present invention impose no restrictions on the implementation of such chains, as long as the above requirement is satisfied. For example, the chain may be constructed using forward pointers, backward pointers, or any other data structures. Such block chaining is quite well known in the prior art, and is not an innovation of the current invention. Many flash memory disk management systems are based on such arrangement, as can be seen, for example, in U.S. Pat. No. 5,937,425 (already mentioned before). Furthermore, the operations required for updating the chains (i.e. inserting a new block at the end, removing the oldest block from the beginning, etc.) can be done safely and atomically using methods known in the prior art. Additionally, an implementation may map a virtual block to no more than two physical blocks (which is the absolute minimum required for supporting the methods of the present invention), or it may allow mapping to larger groups of physical blocks. In other words, chains may be limited to length of no more than two blocks, or they may allow longer sequences of blocks.

A first preferred embodiment, according to the present invention, provides for a ruggedized block device driver with practically no extra storage requirements on the storage media for overhead data, except for what is required for maintaining the chains.

Figure 4A:
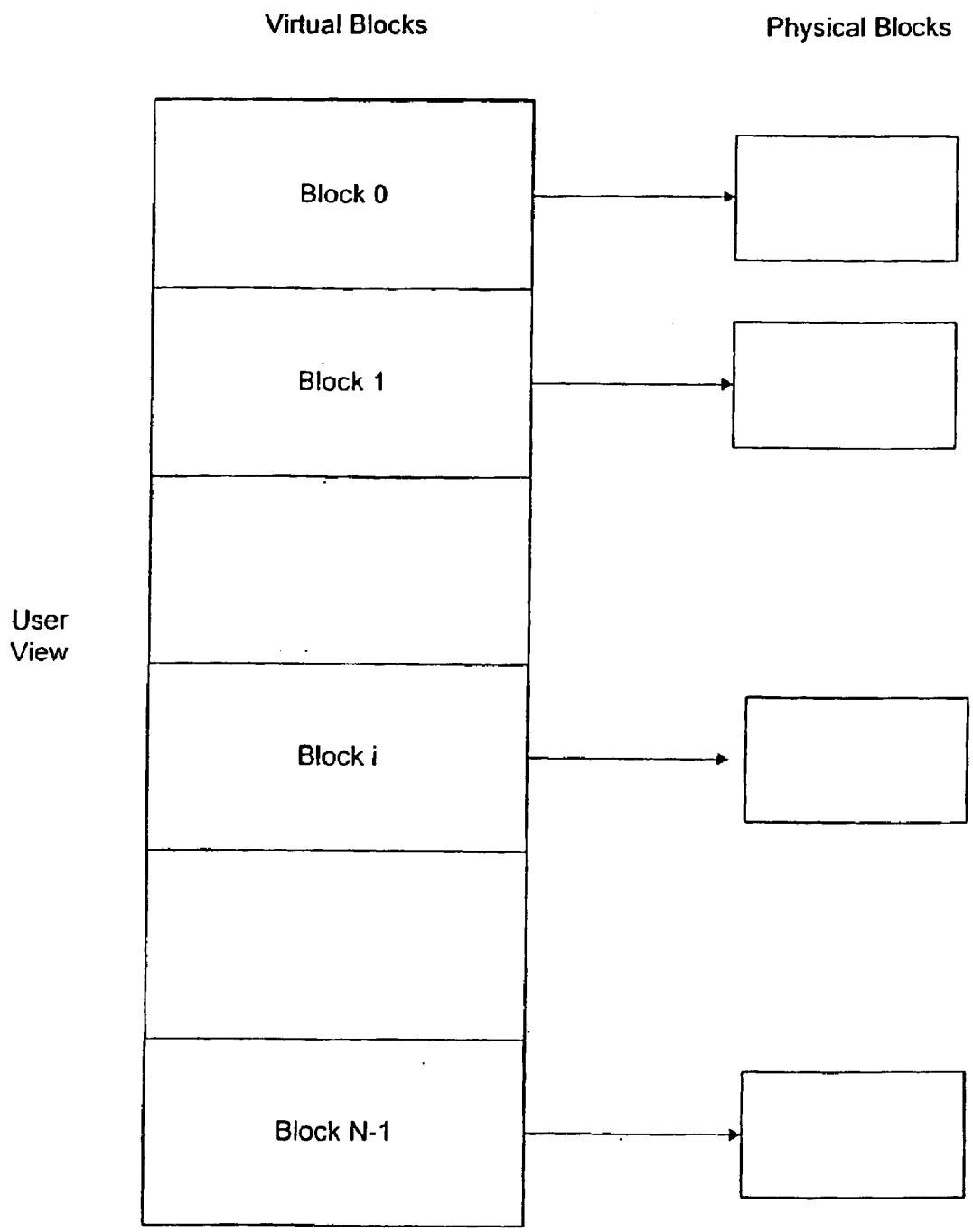

FIGS. 4A–4E describe the sequence of events taking place while the driver moves between two consistent states. In FIG. 4A the driver is shown in an initial consistent state in which every virtual block is mapped into a single physical block. (For simplicity the figure does not show the additional unmapped physical blocks that contain no useful data at this stage. Also, for simplicity, the figure assumes that all virtual blocks contain data and none of them is empty. This simplification, however, has no effect on the validity of the invention methods, which can easily be extended to such empty blocks).

Figure 4B:
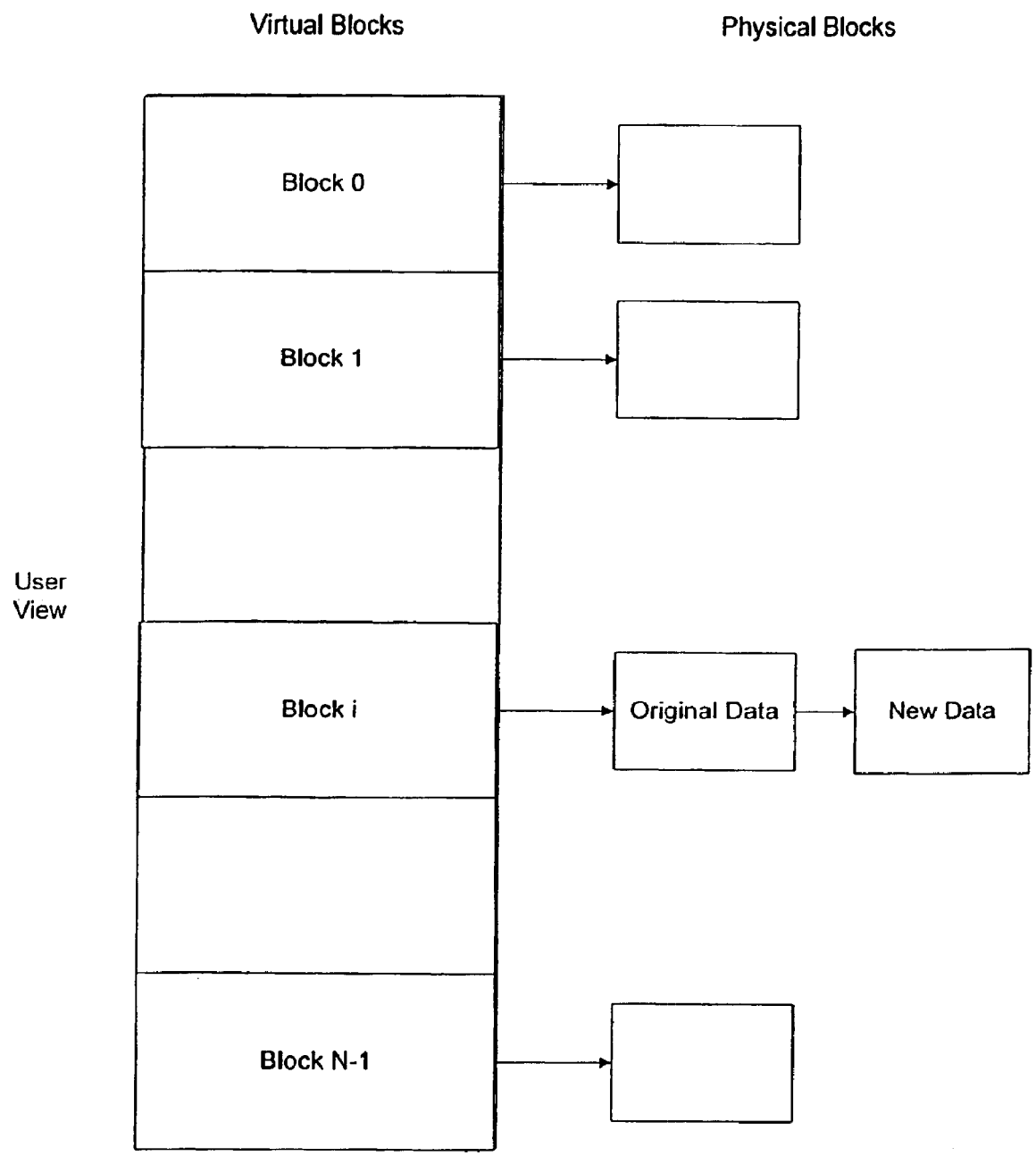

In FIG. 4B the driver state is shown after one block was written (virtual block "i" in the figure). As can be seen in the figure, the original data is not overwritten, as it may be needed in case a failure will cause us to roll back to the initial consistent state. Instead, a free physical block is added to the mapping of the written virtual block (that is, to the physical blocks chain of the virtual block), and the new data is written into it.

Figure 4C:
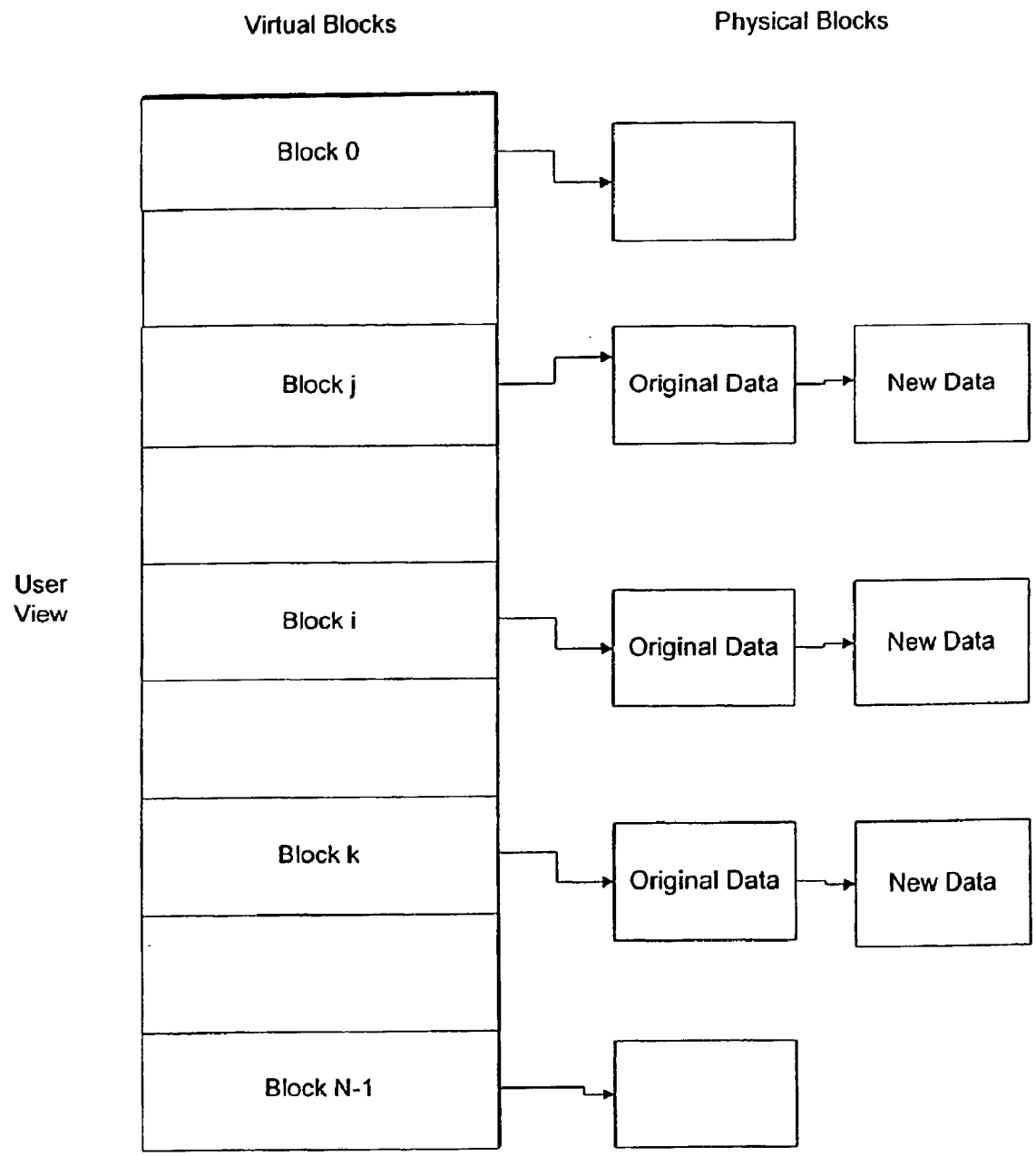

In FIG. 4C the driver state is shown after two more blocks were written, and before committing the driver to a new consistent state. Now virtual blocks "j" and "k" are also each assigned a second physical block containing their new data. The three newly written blocks reflected in FIG. 4C may be for example the creation of a new file, the resulting update of a directory structure, and the resulting update of a File Allocation Table. These three operations are typically combined together by a FS, and a situation where only some them are reflected in the media after a recovery from a power loss is highly undesirable, as it is a corruption of the FS state and should be avoided.

Figure 4D:
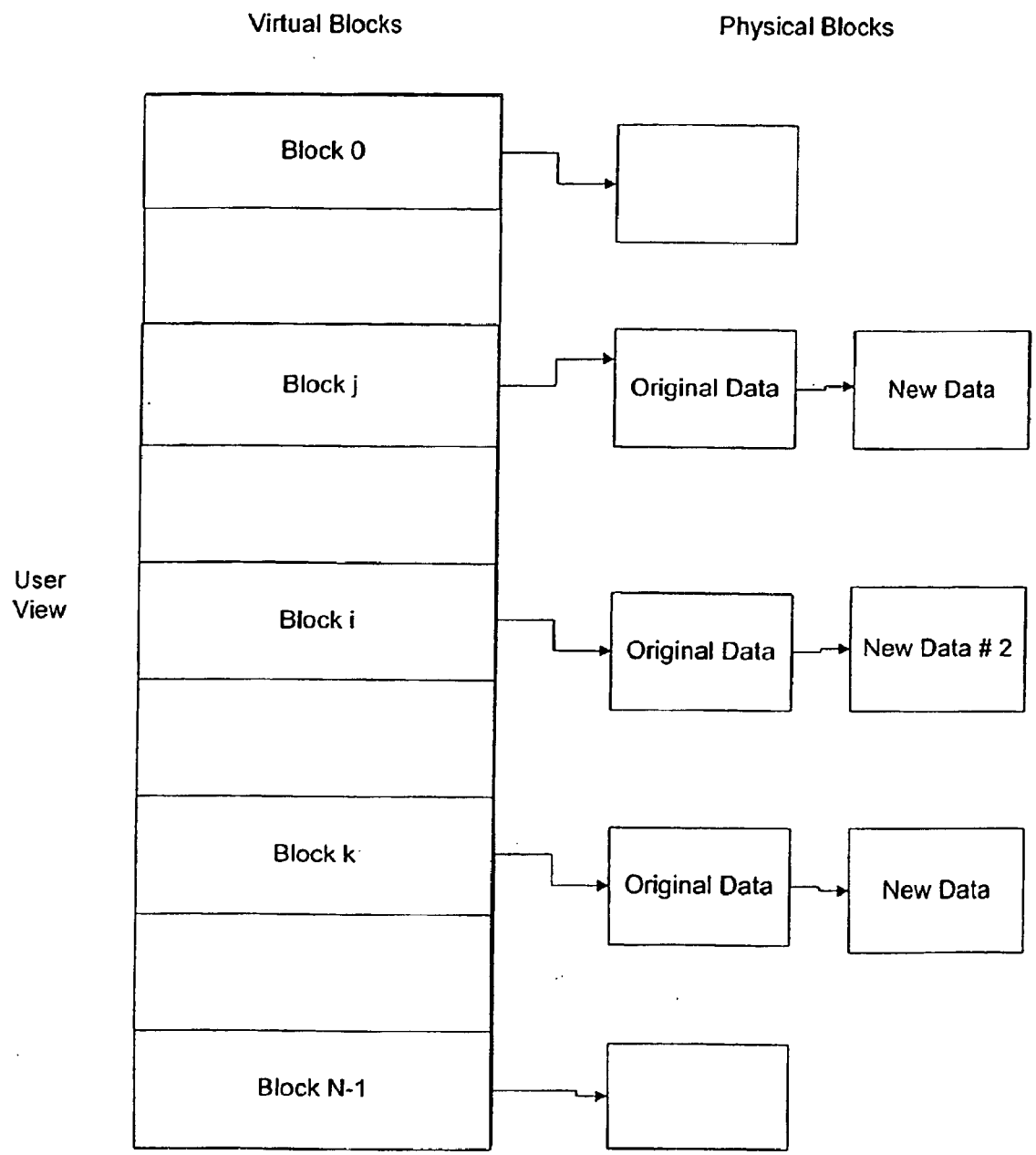

In FIG. 4D, the driver state is shown after one more write request is done on virtual block "i", and still before committing the driver to a new consistent state. In order to distinguish between the previously written new data and the newer version of it, the figure uses the term "new data #2" to refer to the most recent version. As in this case of writing again to virtual block "i", an alternative physical block already exists (in other words—the chain length for virtual block "i" is already two), no new physical block is allocated and the new data is written into the last block in the chain, overwriting its previous contents. This is a logical thing to do, as from now on there is no need for this overwritten version—either we eventually get safely to the next consistent state and use the newer data, or we fall back to the previous consistent state and use the original data. In either case the overwritten data will not be used any more.

Figure 4E:
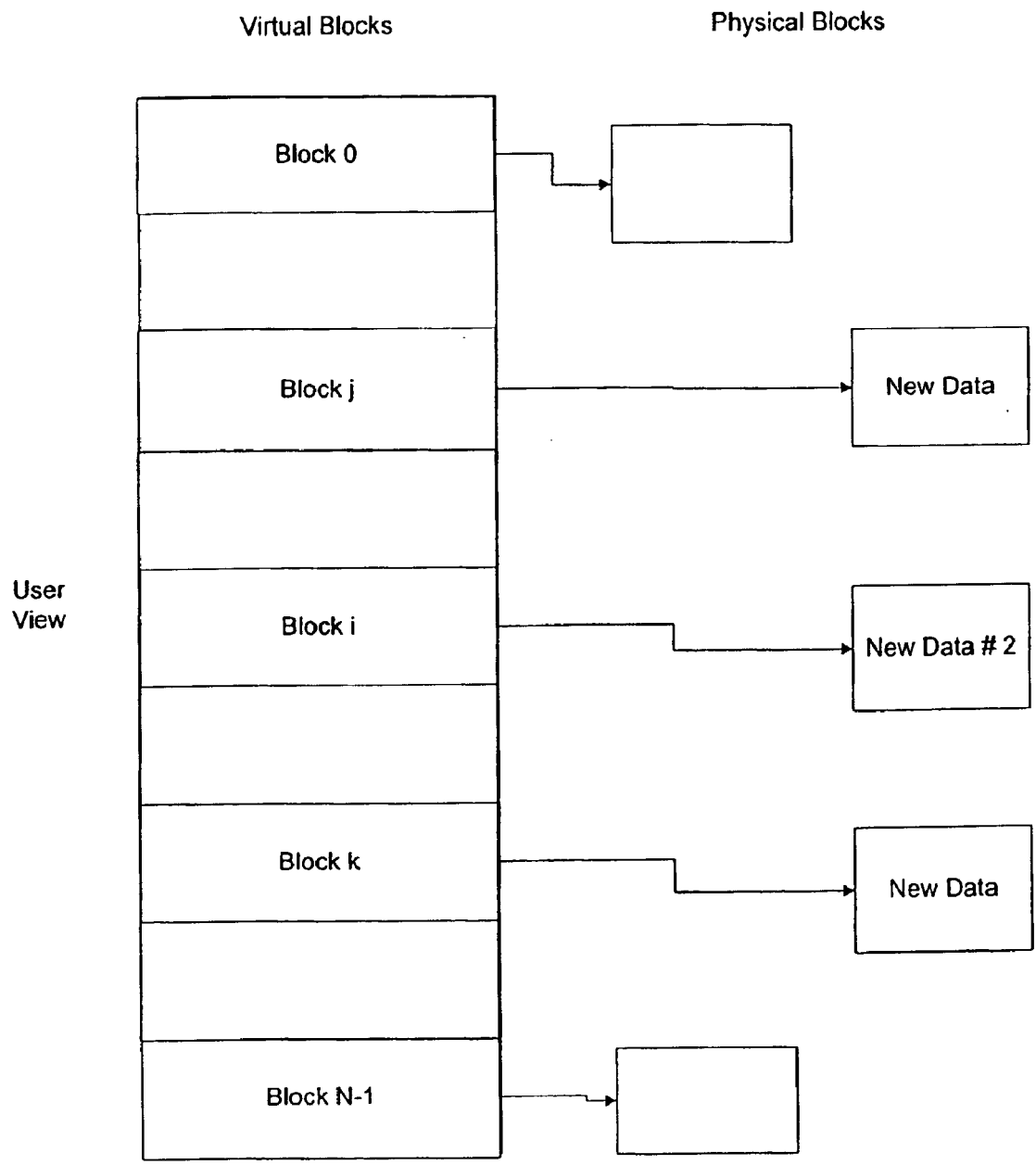

In FIG. 4E the driver state is shown after the driver receives a request to make the current state a new consistent state. This is achieved by the driver, by simply examining each virtual block for the existence of a physical blocks chain with a length of two. For each such chain, the driver drops the first block and keeps only the second one. The end result of the above procedure is that we are left with a new consistent state, reflecting all operations performed before this new state. Actually, we are back again in a state similar to that of FIG. 4A, and the whole sequence of accumulating changes until another consistent state is defined, can now repeat itself.

In considering what will happen if a sudden power loss would occur at any point in time during the above sequence of events, the following can be said. When the driver wakes up, it scans the media state—each virtual block is examined for the existence of a physical blocks chain with a length of two. In the case where such a situation is detected, the driver drops the last block in the chain and keeps only the first one. One will notice that this operation is exactly the opposite of the one described above for creating a next consistent state. The end result of the above procedure is that we are left with the old consistent state, where all changes that occurred later in time are removed. If a power loss occurred anywhere in time between the states of FIGS. 4A and 4E (not inclusive), this wake-up procedure will bring the system back to the state of FIG. 4A. However, if the power loss occurred after the state of FIG. 4E was reached, there is no need to go back to the 4A state. Any recovery following this point will be to the 4E state, until another consistent state is created.

It should also be noted that at any time, a read operation from a virtual block returns the most recent data written into that block, regardless of any consistent point. In other words, the read operations always return the data at the newest edge of the chain. Of course, if a roll-back occurred as a result of a power loss, the read operation will then return the data belonging to that previous roll-back state, as all newer data was already deleted.

A second preferred embodiment, according to the present invention, provides for a ruggedized block device driver with minimal extra storage requirements on the storage media for overhead data, except for what is required for maintaining the chains.

In order for a driver to use the methods of this second embodiment, the only requirement is to have one bit allocated by the driver per each physical block (hereinafter called the "ruggedness" bit or the "R bit" of the block). For example, in a flash memory disk based on NAND-type flash devices, each block ("page" in the terminology commonly used by flash memory vendors) has a "spare" or "extra" storage space attached to it, which may be used for storing this bit. In other types of storage media, which do not provide such built-in extra storage, the driver may set aside some portion of the physical storage space for storing the R bits of all exported blocks.

FIG. 5 shows the internal storage organization of a device driver using the methods of this embodiment. This figure is almost identical to FIG. 3, but with the addition of the R bit 51 to each physical block.

Figure 6A:
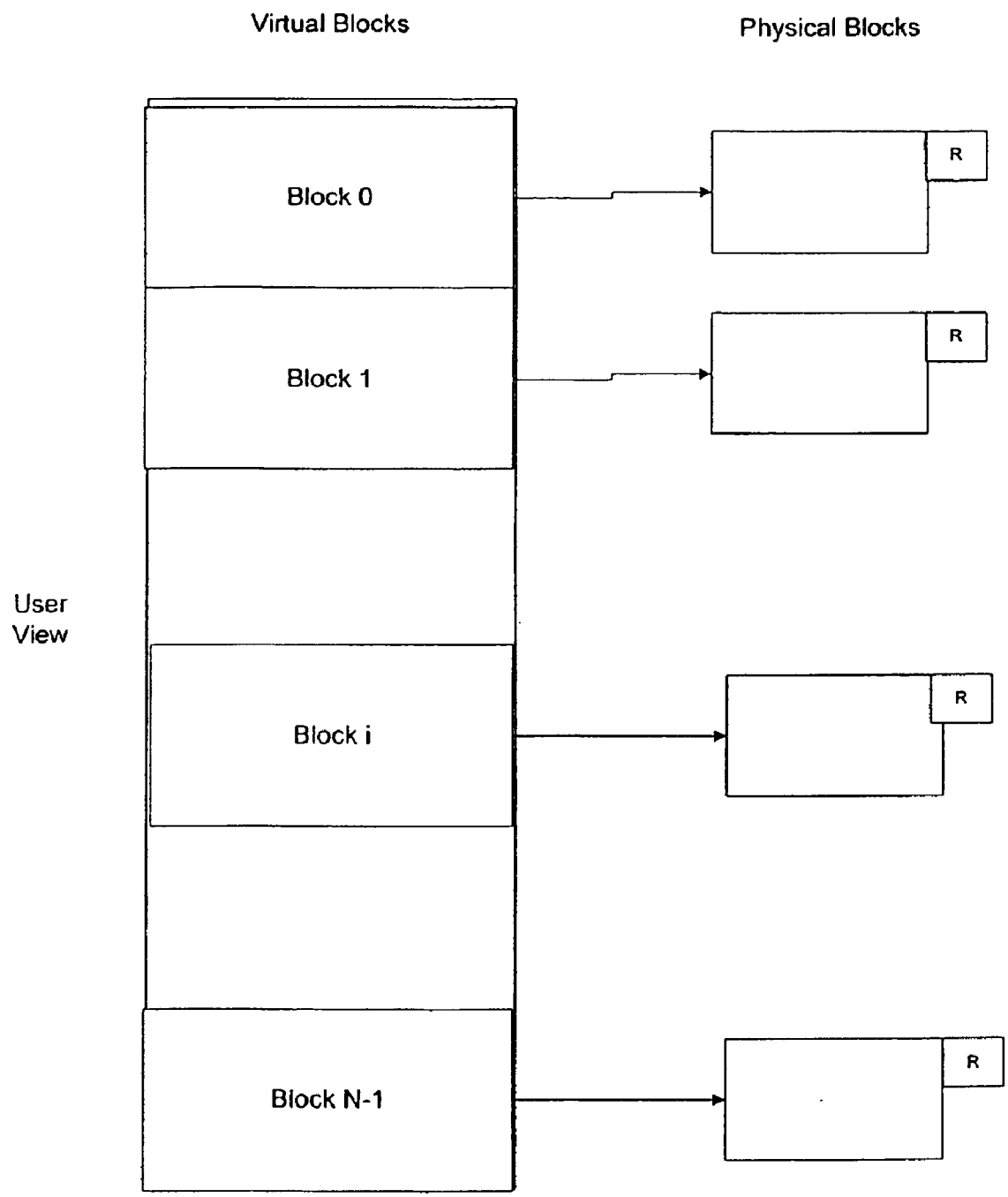

FIGS. 6A–6E describe the sequence of events taking place while the driver moves between two consistent states. In FIG. 6A, the driver is shown in an initial consistent state in which every virtual block is mapped into a single physical block. (The same simplifying assumptions as listed above for FIG. 4A were also made here. Additionally, FIG. 6A does not describe the most general case of a consistent state, as will be described later). Each physical block has its associated R bit, but it is totally unimportant what value this bit has at this stage. Moreover, it is not even required for all blocks to have the same value of R bit, so some blocks may have R=1 while others have R=0.

Figure 6B:
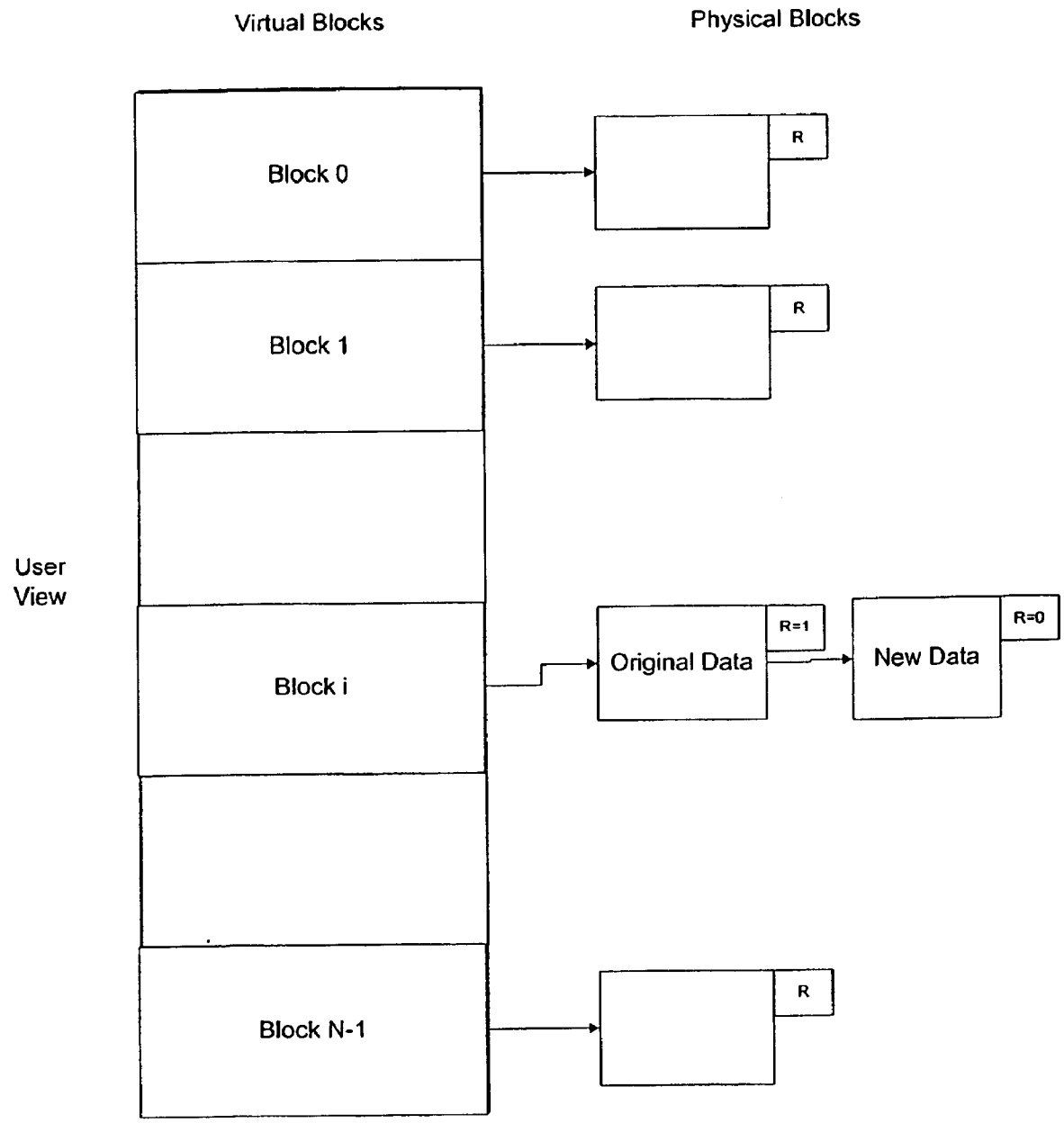

In FIG. 6B, the driver state is shown after one block was written (virtual block "i" in the figure). As we see in the figure, we do not overwrite the original data, as it may be needed in case a failure will cause us to roll back to the initial consistent state. Instead, a free physical block is added to the mapping of the written virtual block (that is, to the physical blocks chain of the virtual block), the new data is written into it, and its R bit is set to complement the R bit in the block containing the original data. In the figure we arbitrarily assumed the original block had R=1 and therefore the new block was marked with R=0, but it could be the other way around without effecting the validity of the methods of the current invention.

Figure 6C:
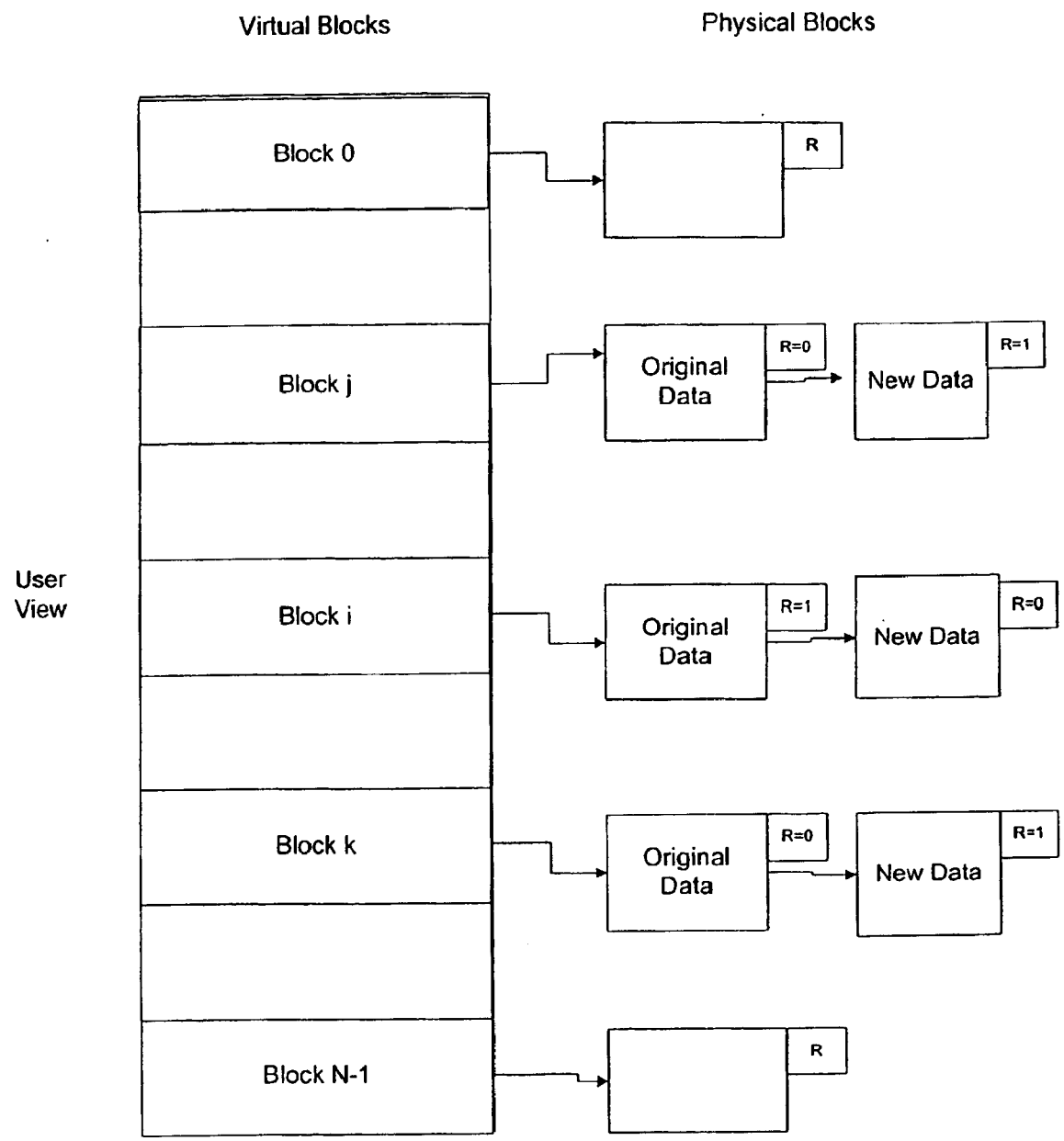

In FIG. 6C the driver state is shown after two more blocks were written, and before committing the driver to a new consistent state. Now virtual blocks "j" and "k" are also each assigned a second physical block containing their new data, and again the R bits of the new blocks are the complements of the R bits of the blocks they are potentially replacing. Note that the R bits of the new blocks for virtual blocks "i" and "j" are different. As was stated above, the R bit value by itself is meaningless, the only important fact being its relation to the R bit value of the block it potentially replaces.

Figure 6D:
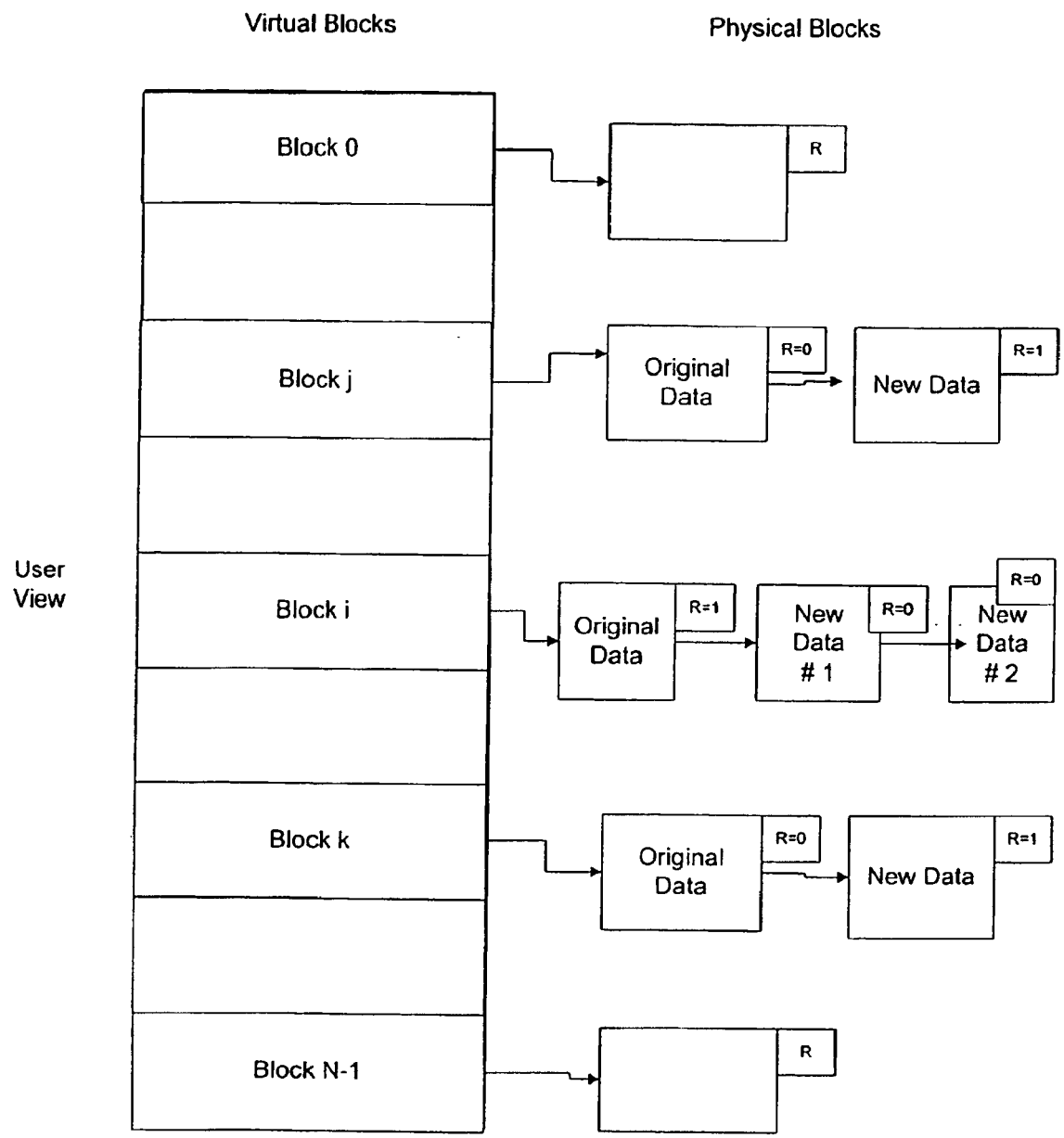

In FIG. 6D the driver state is shown after one more write request is done on virtual block "i", and still before committing the driver to a new consistent state. Here (contrary to the previous embodiment) a new free physical block is added to the mapping of the written virtual block (extending its chain to more than two blocks), and the newest data ("new data #2") is written into it. The R bit of this newly allocated block is again set to complement the R bit value of the block containing the initial data. In other words, the new R bit is made equal to the R bit of the previous written block in its chain. This step in effect extends the chain of blocks mapped to the corresponding virtual block, while making sure all blocks containing data still not committed to a consistent state have the same R value, which is different than the R value of the first block in their chain.

Figure 6E:
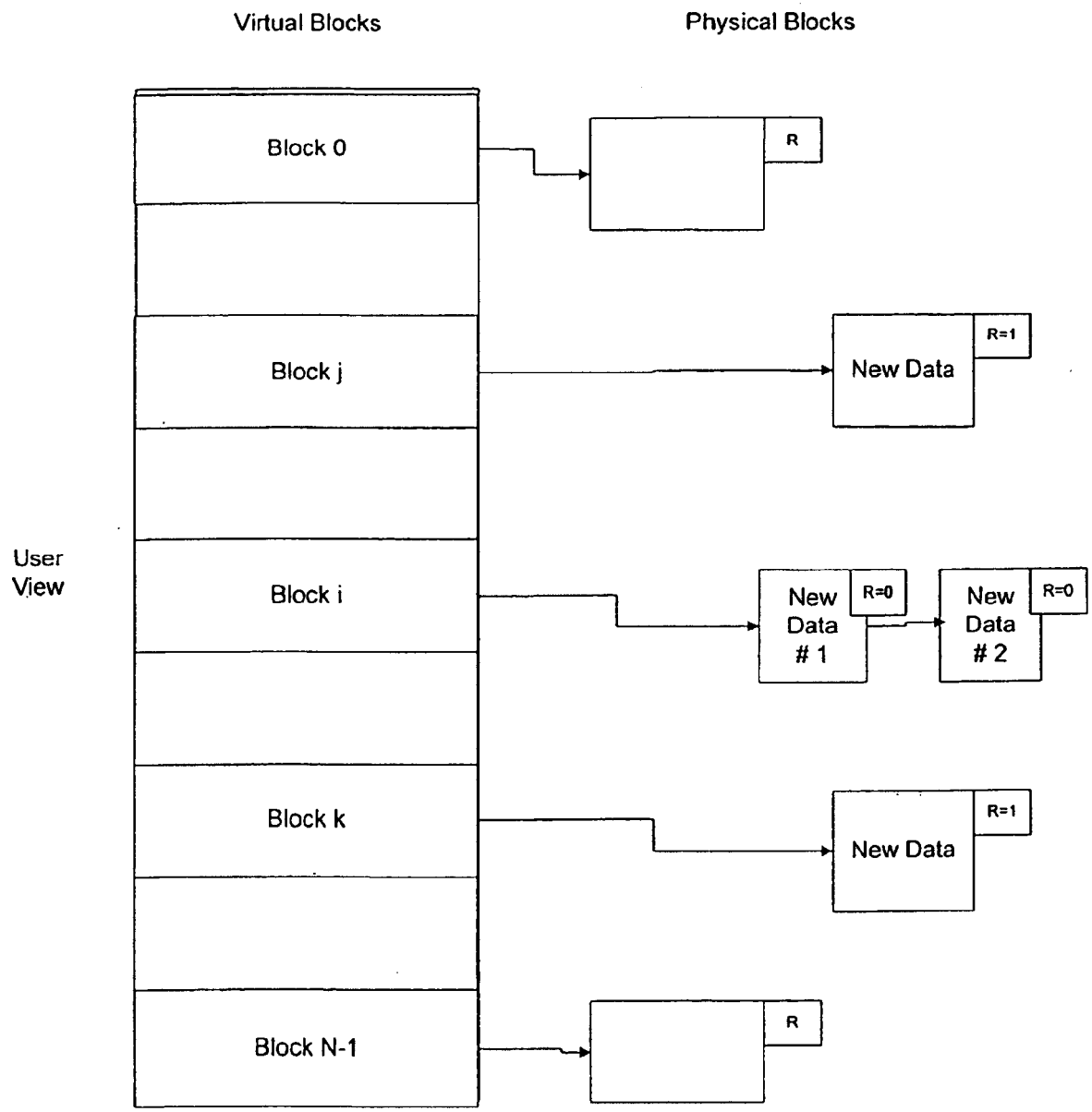

In FIG. 6E the driver state is shown after the driver receives a request to make the current state a new consistent state. This is achieved by the driver, by simply examining each virtual block for the existence of a physical blocks chain where the R bit value changes somewhere along the chain. In the case where such a situation is detected, all physical blocks preceding the R value change (to the left of the change point in the figures) are removed from their chains. The end result of the above procedure is that we are left with a new consistent state, reflecting all operations performed before this new state. Actually, we are back again in a state similar to that of FIG. 6A, and the whole sequence of accumulating changes until another consistent state is defined, can now repeat itself.

One noticeable difference between FIGS. 6A and 6E is that in FIG. 6E, one virtual block has already more than one physical block assigned to it, a condition that does not exist in FIG. 6A. However, as can readily be seen, this has no effect on the steps leading from FIG. 6A to FIGS. 6B, 6C, 6D and 6E, and the same methods can still be applied. FIG. 6E is the figure more correctly reflecting the general case of a consistent point where a virtual block may have more than one physical block assigned to it. FIG. 6A was simplified in this respect to make it easier to follow the explanations. To summarize this point, the most general case of a chain is when it has one or more blocks at its beginning, all having the same R bit and all written prior to establishing the last consistent state, followed by zero or more blocks all having the same R bit which is the complement of the first group R bit, and all written after establishing the last consistent state. The act of establishing a next consistent state is achieved (when there are such two groups of blocks) by dropping the blocks of the first group.

It should furthermore be considered what will happen if a sudden power loss would occur at any point in time during the above sequence of events. When the driver wakes up, it scans the media state—each virtual block is examined for the existence of a physical blocks chain where the R bit value changes somewhere along the chain. In the case where such a situation is detected, all physical blocks following the R value change (to the right of the change point in the figures) are removed from their chains. It may be noticed that this operation is exactly the opposite of the one described above for creating a next consistent state. The end result of the above procedure is that we are left with the old consistent state, with all changes occurring later in time being removed. If a power loss occurred anywhere in time between the states of FIGS. 6A and 6E (not inclusive), this wake-up procedure will bring us back to the state of FIG. 6A. However, if the power loss occurred after the state of FIG. 6E was reached, there is no need to return to the 6A state. Any recovery following this point will be to the 6E state, until another consistent state is created.

It should be noted that at any time, a read operation from a virtual block returns the most recent data written into that block, regardless of any consistent point. In other words, the read operations completely ignore the R bits and always return the data at the newest edge of the chain. Of course, if a roll-back occurred as a result of a power loss, the read operation will then return the data belonging to that previous roll-back state, as all newer data was already deleted.

A third preferred embodiment, according to the present invention, provides for a ruggedized block device driver which is more flexible than the previous ones, but has higher storage and overhead requirements.

In order for a driver to use the methods of this embodiment, it is required to have one numeric field allocated by the driver per each physical block (hereinafter called the "generation" field or the "gen" field of the block), for storing the consistent state association of the block. This field may be an 8-bit byte, a 16-bit word, or any other convenient size. The considerations of where to store these fields are similar to the ones mentioned for the R bits of the previous embodiment—in the extra area of NAND flash blocks, in a specially set-aside portion of the physical storage space, etc. Additionally, the driver must maintain one global generation field associated with the driver's state as a whole (rather than with an individual block), which is stored on the physical media.

FIG. 7 shows the internal storage organization of a device driver using the methods of this embodiment. This figure is almost identical to FIG. 3, but with the addition of the generation field to each physical block, and the existence of the global generation driver state.

Figure 8A:
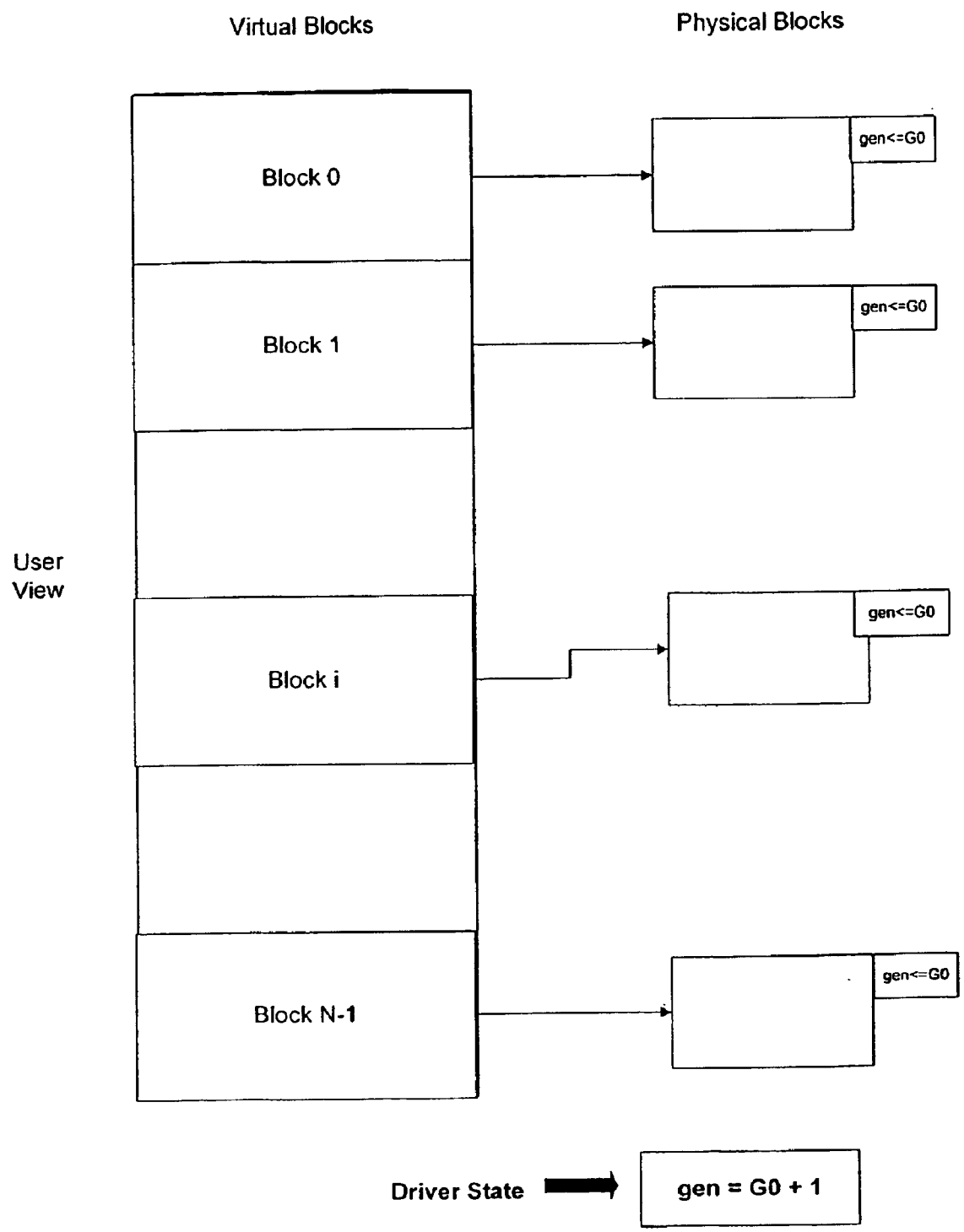

FIGS. 8A–8E describe the sequence of events taking place while the driver moves between two consistent states. In FIG. 8A the driver is shown in an initial consistent state in which every virtual block is mapped into a single physical block. (The same simplifying assumptions as listed above for FIG. 4A were also made here. Additionally, FIG. 8A does not describe the most general case of a consistent state, which will be described later). Each physical block has its associated generation field, and it is not required for all blocks to have the same generation value. Let us call the currently highest value of all block generation fields by the name $G_0$. This implies that for all blocks the relation "generation<=$G_0$" is true. As shown in the figure, the driver's global generation state is $G_0+1$, which implies that for all blocks the relation "generation<driver's global generation" is also correct. (In the present description we assume the generation fields are regular numeric fields that obey the intuitive arithmetic relations. The reader will easily realize there is no need for this to be true for the methods of this solution to be applicable. We may, for example, see the generation fields as counters modulo some number, in which case a value of zero follows, and is considered larger than, the maximal value. The simple arithmetic model will, however, be used, for simplifying the explanations.

Figure 8B:
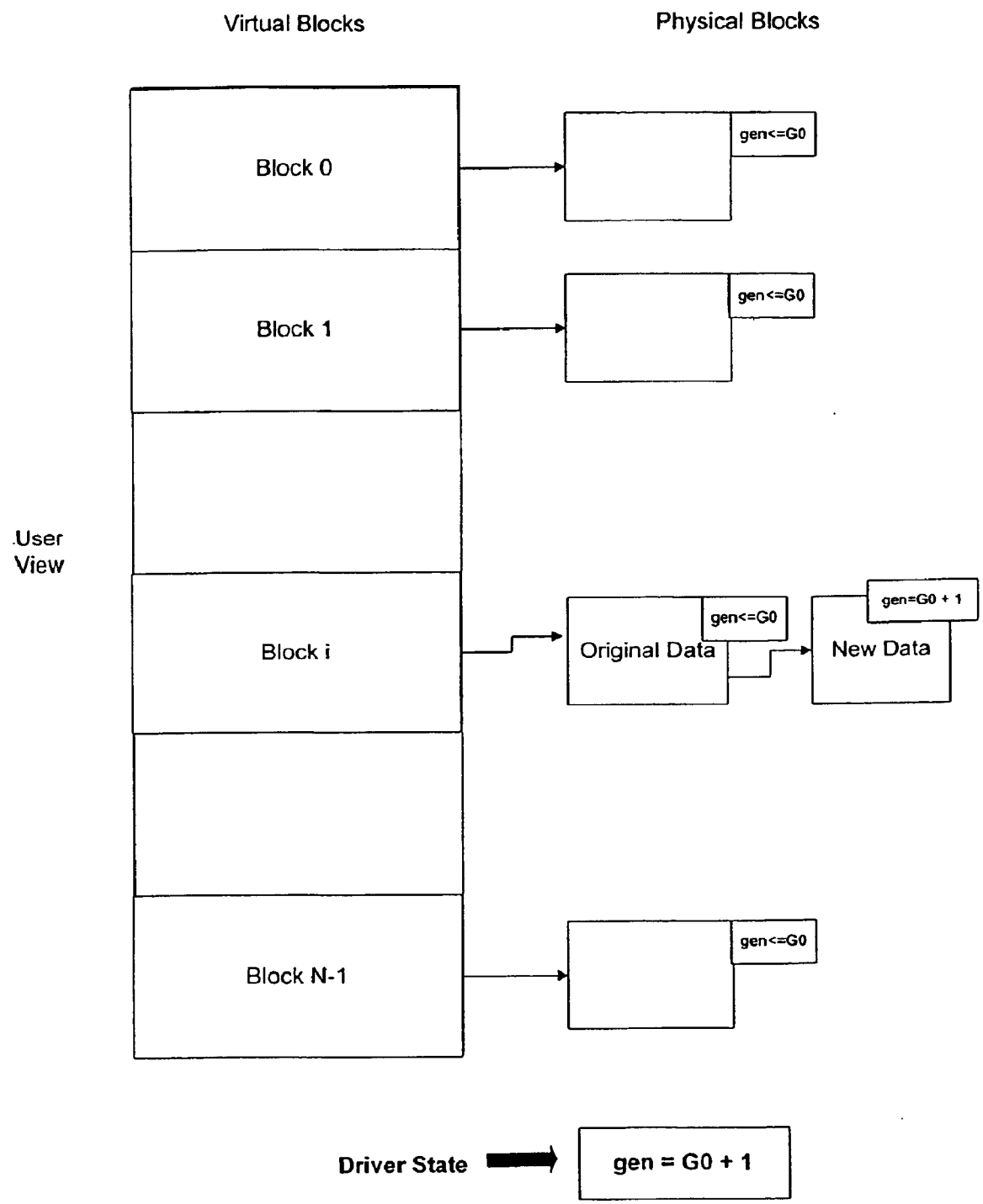

In FIG. 8B the driver state is shown after one block was written (virtual block "i" in the figure). As can be seen in the figure, the original data is not overwritten, as it may be needed in case a failure will cause the rolling back to the initial consistent state. Instead, a free physical block is added to the mapping of the written virtual block (that is—to the physical blocks chain of the virtual block), the new data is written into it, and its generation field is set to the current value of the driver's global generation, which in this case is $G_0+1$. The driver's global generation is not changed at this stage, causing block "i" to have a generation value equal to the driver's global generation.

Figure 8C:
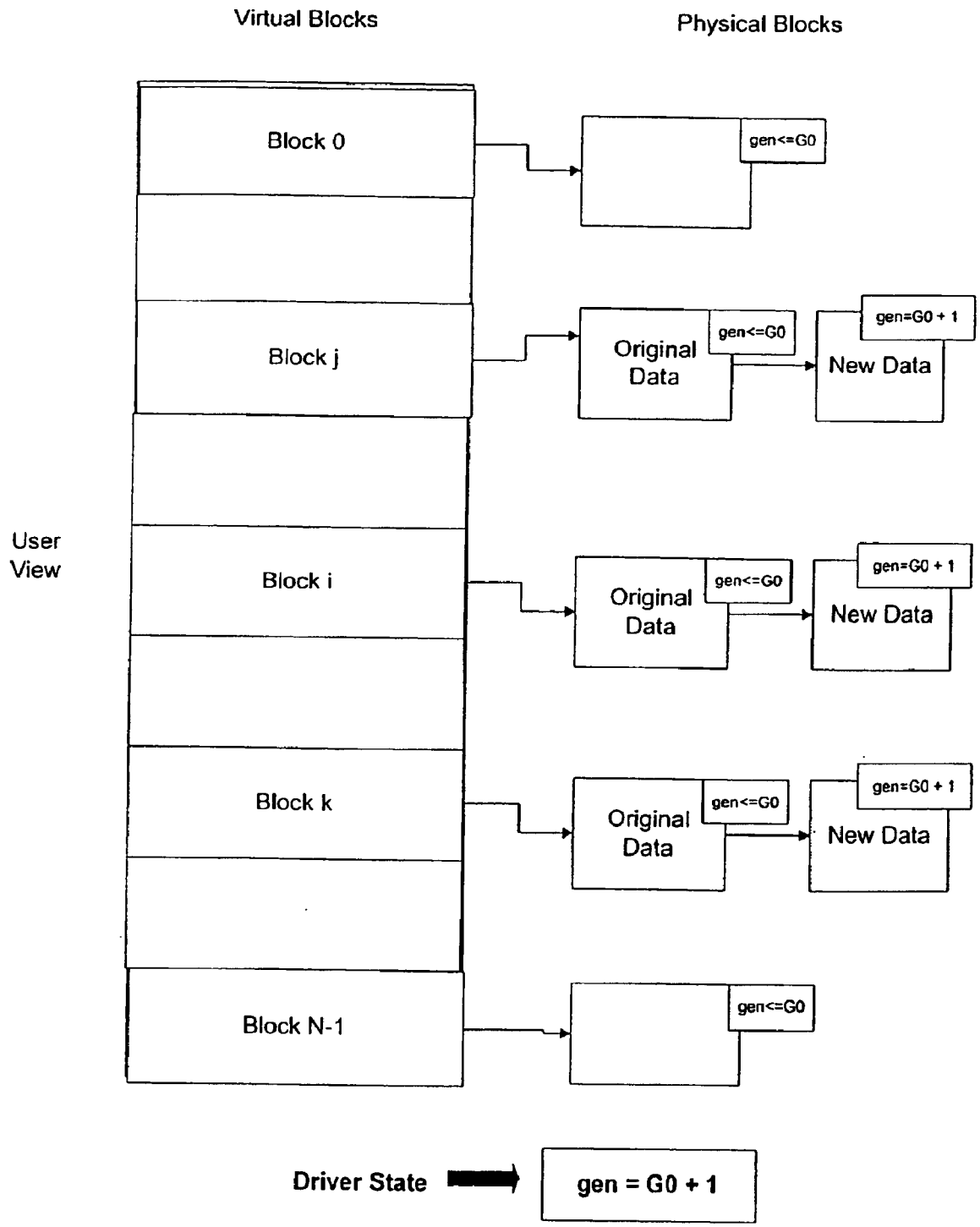

In FIG. 8C the driver state is shown after two more blocks were written, and before committing the driver to a new consistent state. Now virtual blocks "j" and "k" are also each assigned a second physical block containing their new data, and again the generation fields of the new blocks are set to the current value of the driver's global generation.

Figure 8D:
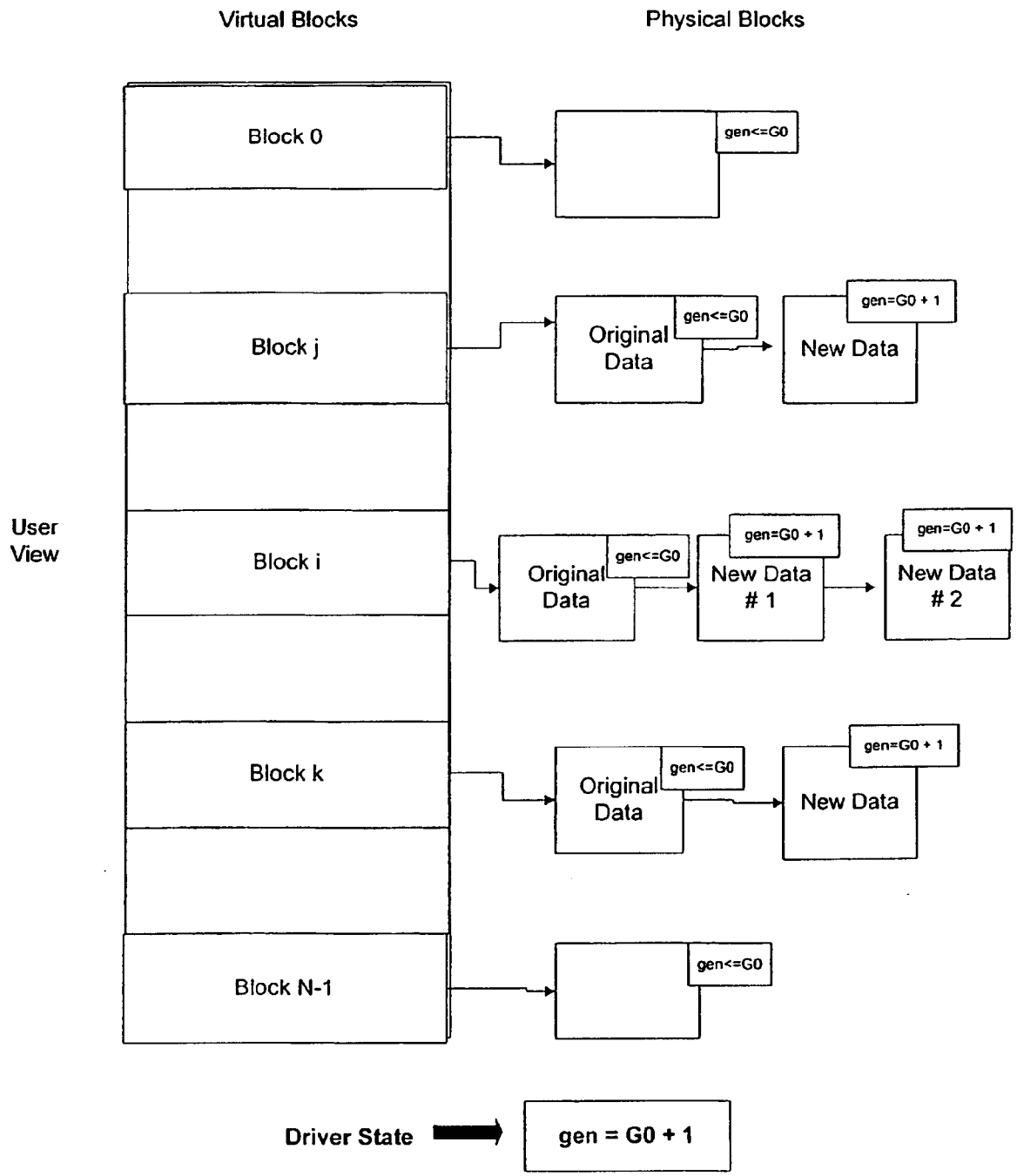

In FIG. 8D the driver state is shown after one more write request is done on virtual block "i", and still before committing the driver to a new consistent state. Here (as in the previous solution) a new free physical block is added to the mapping of the written virtual block (extending its chain to more than two blocks), and the newest data ("new data #2") is written into it. The generation field of this newly allocated block is again set to the current value of the driver's global generation. In other words, the new generation field is made equal to the generation field of the previous written block in its chain. This step in effect extends the chain of blocks mapped to the corresponding virtual block, while making sure all blocks containing data still not committed to a consistent state are having the same generation value which is equal to the driver's current global generation, but different than the generation of the first block in their chain.

Figure 8E:
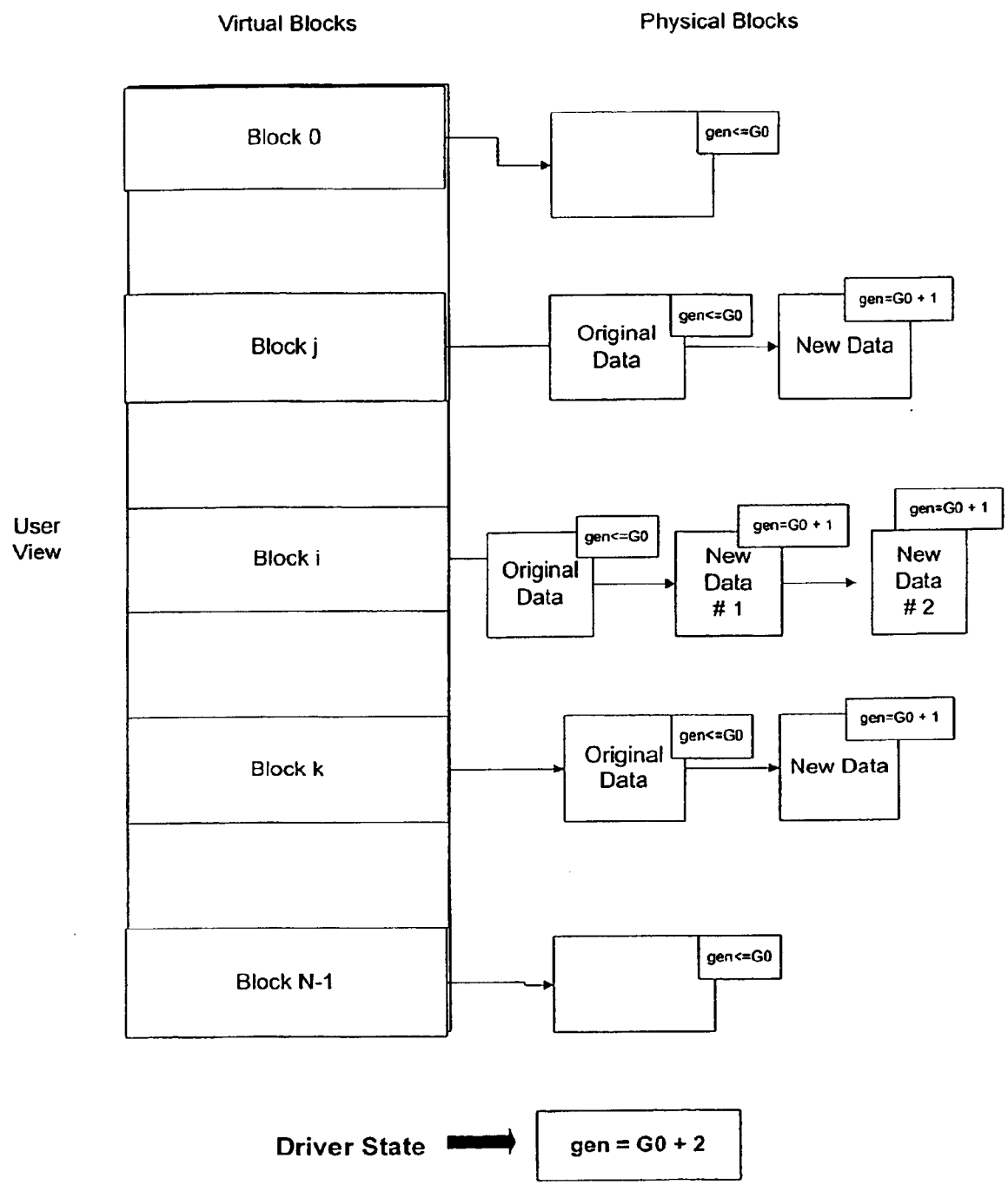

In FIG. 8E the driver state is shown after the driver receives a request to make the current state a new consistent state. This is achieved by the driver, by simply incrementing the driver's global generation by one, such that the driver's global generation will now equal $G_0+2$, as can be seen in the figure. Nothing at all is done in the blocks chains. The end result of this operation is that we are left with a new consistent state, reflecting all operations performed before this new state. Actually, we are back again in a state similar to that of FIG. 8A, as again we have the relation "generation<driver's global generation" correct for every block, and the whole sequence of accumulating changes until another consistent state is defined, can now repeat itself.

The reader might notice that FIGS. 8A and 8E do not look similar at first glance—in 8E a few virtual blocks have already more than one physical block assigned to them, a condition which does not exist in FIG. 8A. However, as can readily be seen, this has no effect on the steps leading from FIG. 8A to FIGS. 8B, 8C, 8D and 8E, and the same methods can still be applied. FIG. 8E is the figure that more correctly reflects the general case of a consistent point where a virtual block may have more than one physical block assigned to it. FIG. 8A was simplified in this respect to make it easier to follow the explanations. To summarize this point, the most general case of a chain is when it has one or more blocks at its beginning, having their generation fields constitute a non-decreasing sequence with the last value in the sequence (and consequently all values in the sequence) being smaller than the driver's global generation, followed by zero or more blocks all having their generation fields equal to the driver's global generation. All blocks in the first part of the chain were written prior to establishing the last consistent state, and all blocks in the second part of the chain (if it is not empty) were written after establishing the last consistent state. The act of establishing a next consistent state is achieved by incrementing the global generation value, thus causing all blocks in the chain to become part of the first group, with the second group becoming empty.

In considering what will happen if a sudden power loss would occur at any point in time during the above sequence of events, the following can be said. When the driver wakes up, it first reads its global generation field, and then it scans the media state—each virtual block is examined for the existence of a physical blocks chain with at least one block having a generation value equal to the global generation. In the case where such a situation is detected, all physical blocks having that generation value (which must all be at the right of the chains in the figures) are removed from their chains. The end result of the above procedure is that we are left with the old consistent state, with all changes occurring later in time being removed. If a power loss occurred anywhere in time between the states of FIGS. 8A and 8E (not inclusive), this wake-up procedure will bring us back to the state of FIG. 8A. However, if the power loss occurred after the state of FIG. 8E was reached, there is no longer a need to return to the 8A state. Any recovery following this point will be to the 8E state, until another consistent state is created.

It should also be noted that at any time, a read operation from a virtual block returns the most recent data written into that block, regardless of any consistent point. In other words, the read operations completely ignore the generation fields and always return the data at the newest edge of the chain. Of course, if a roll-back occurred as a result of a power loss, the read operation will then return the data belonging to that previous roll-back state, as all newer data was already deleted.

It should be noted that this third embodiment has a few characteristics that differentiate it from the previous embodiments:

a. The solution requires the driver's state (the global generation) to be kept on the storage media as non-volatile information, with updates taking place in an atomically safe way. Methods for achieving this task are well known in the prior art. For example, the Hitz patents mentioned above provide a detailed presentation of how information can be safely updated on the media by using two copies of the data to be protected, plus checksum fields, plus a field that is incremented per update. This method is fully safe against any possibility of power loss. Even though Hitz presents this method for the purpose of achieving ruggedness in a file system (and not in a block device driver, as is the case here), his method is applicable here.

b. In order for the solution to keep working correctly for long periods of time and long sequences of consistent states, it will eventually require a "clean-up" operation. This will happen when the global generation value will no longer be able to be incremented without violating the arithmetic assumptions of the model. For example, if using the modulo approach mentioned above, the global generation might "catch up" with the generation values of virtual blocks which were not updated for a long time and "lag behind". Remember that during wakeup the driver will delete all blocks having a generation equal to its global generation, so when such a "catch up" occurs these blocks might get deleted. There are many ways in which such clean up can be done, for example by bringing all chains to the generation of the currently highest generation of any existing chain, thus making the relation "generation= global generation-1" correct for all blocks. This can simply be achieved by extending each chain with a copy of its last block. Such procedure will give the driver the freedom to run through the maximal number of generations before having to fear another clean up might be required. Obviously, the more bits in the generation field, the less frequent is the need for clean up.

For all solutions described so far, it should be remembered that it might happen that a write request which requires the allocation of a free block is received by the driver, but there is no free block to allocate. As the updating of blocks following the establishment of a consistent state requires storage space for storing both the previous and new data (except in the first solution when updating the same block more than once), it is quite possible that accumulating too many updates before a next consistent state might cause this lack of space to happen. There is a trade-off here for the driver's designer in deciding how many virtual sectors are exported compared to the amount of physical blocks on the media. The less virtual blocks—the more space is set aside for chaining and the more operations can be accumulated, but the less logical space is available on the device. The more virtual blocks—the less operations can be accumulated, but the more logical space is available. The driver's response to a condition of lack of space is also a designer's decision, with the most reasonable approach being to return a special return code to the caller. The most typical action to be taken by the caller would then be to instruct the driver to roll back to the last consistent state and then attempt moving forward again in smaller steps, possibly after making more room on the media by deleting unneeded data and initiating whatever compacting tools the system provides.

As mentioned above, all explanations so far assumed that a block can be read, written, erased or allocated independently of any other block. While this assumption is correct for magnetic disks, it is not necessarily correct for all types of storage media. For example, in NAND-type flash memory, the minimal chunk for erasing is not a single block but a group of a few adjacent ones (hereinafter called a "unit"), with typically 16 or 32 blocks in a single unit. (Care should be taken to avoid confusion in terms, as in flash memory data sheets it is common to use the term "page" for what we call "block" here, while the term "block" refers to what we call "unit"). Consequently, in such devices it is not cost-effective to make storage allocations for single blocks but only for complete units. However, the methods of the present invention are equally applicable to this case where allocation of blocks must be done in groups, with simple adaptations that will be obvious to any one skilled in the art. We shall demonstrate here the applicability of the methods of the second solution described above to this case, but the same is true for the other methods of the present invention. Hereinafter, such device in which erasing must be done in units rather than single blocks is called a "unit-based" device.

FIG. 9 shows the internal storage organization of a device driver using the methods of this solution when applied to unit-based media. This figure is the equivalent of FIG. 5, except that instead of having P physical blocks each independently allocated, we now have U physical units each containing K physical blocks, with the chunk of minimal allocation being a unit.

Figure 10A:
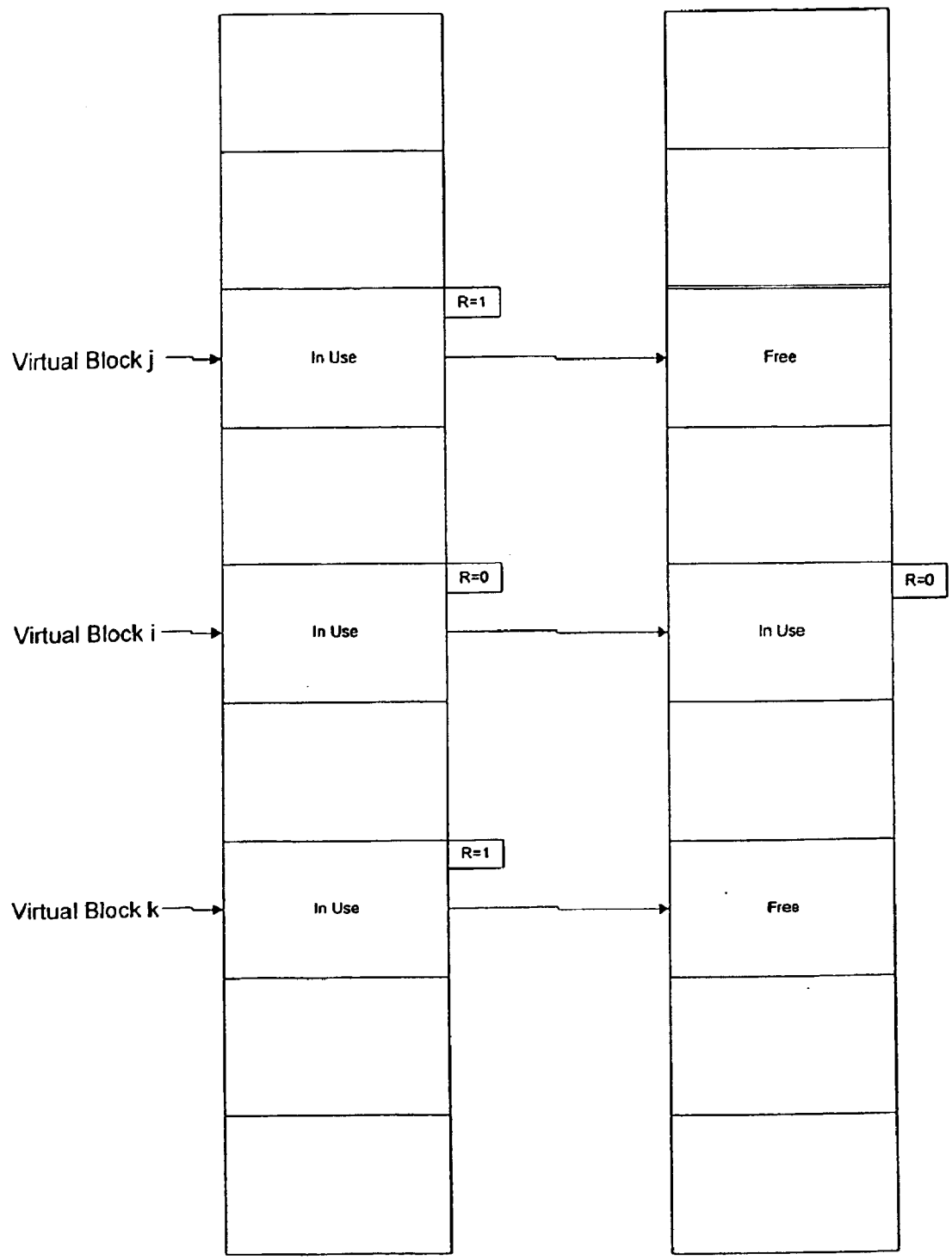

FIGS. 10A–10E describe the sequence of events taking place while the driver moves between two consistent states. For simplicity, each of those figures shows only K virtual blocks (the number of blocks in a unit), but the same methods apply to all units in the media. In FIG. 10A the driver is shown in an initial consistent state which is the equivalent of the one depicted in FIG. 6B. (Note that unlike in the sequence of FIG. 6 where we started with a special case of a consistent state, FIG. 10A shows a most general case in which some virtual block already has a chain longer than one physical block assigned to it). As before, each physical block has its associated R bit, and additionally each physical block has a field keeping its logical state. The group of logical states includes at least the states of "Free", "In use" and "Ignore". It should be understood that such a state field may be available in a block device driver for a unit-based media, regardless if the driver implements the methods of the current invention, as it is typically required for the management of the basic driver functionality. As can be seen in FIG. 10A, some blocks ("j" and "k") have two physical blocks assigned to each of them even though they have no use for this second block and it is marked as Free. This is the effect of the unit-based media organization—as block "i" needed an additional block, a complete physical unit (#2) had to be allocated and chained, giving all neighbors of block "i" an additional block they did not ask for.

Figure 10B:
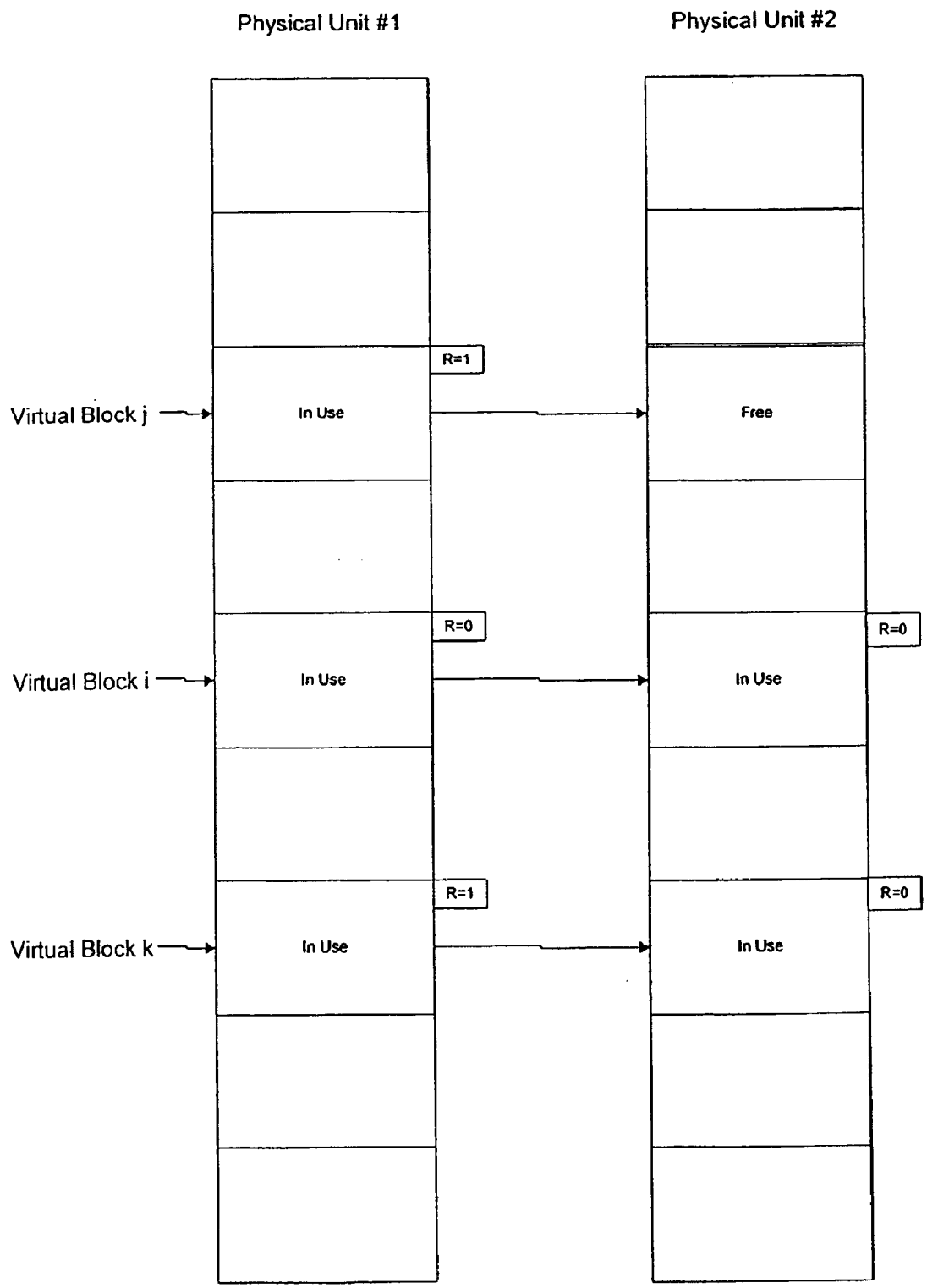

In FIG. 10B the driver state is shown after virtual block "k" is written. According to the methods of this embodiment, the chain of virtual block "k" should be extended with a physical block containing the new data and an R bit set according to this embodiment's rules. This is exactly what is shown in the figure, except that there is no need to make any allocation, as a free block is already available in the chain and can readily be used for the purpose. The state of this physical block is changed from "Free" to "In use" to indicate it now contains valid data.

Figure 10C:
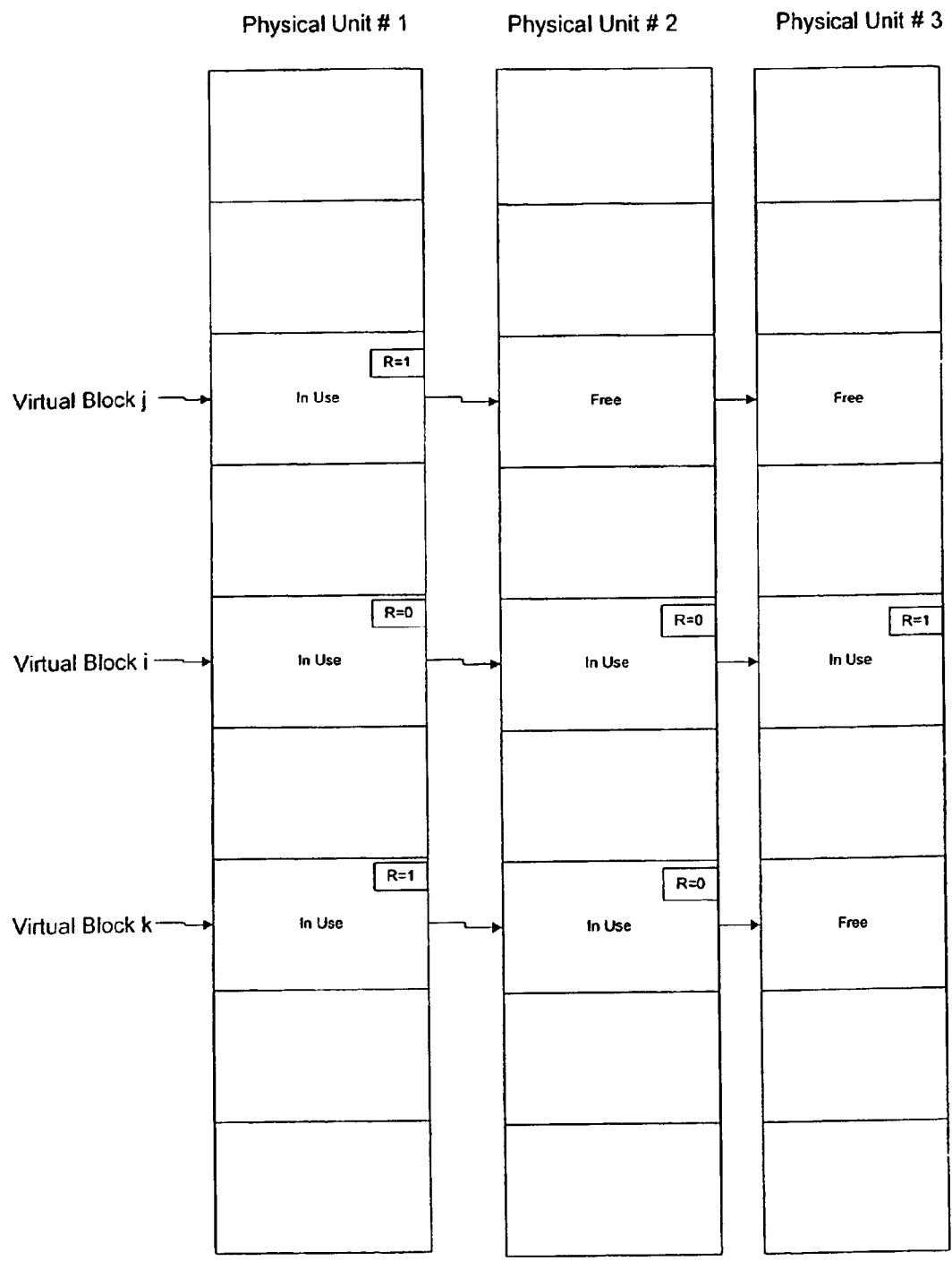

In FIG. 10C the driver state is shown after virtual block "i" is written. This is very similar to the previous step, except that no free block is available for virtual block "i" and a new free physical unit (#3) is allocated and chained. The physical blocks chain of virtual block "i" gets its new block with its associated R bit and "In use" state field, but all other blocks sharing the same unit also get extra blocks marked as "Free".

Figure 10D:
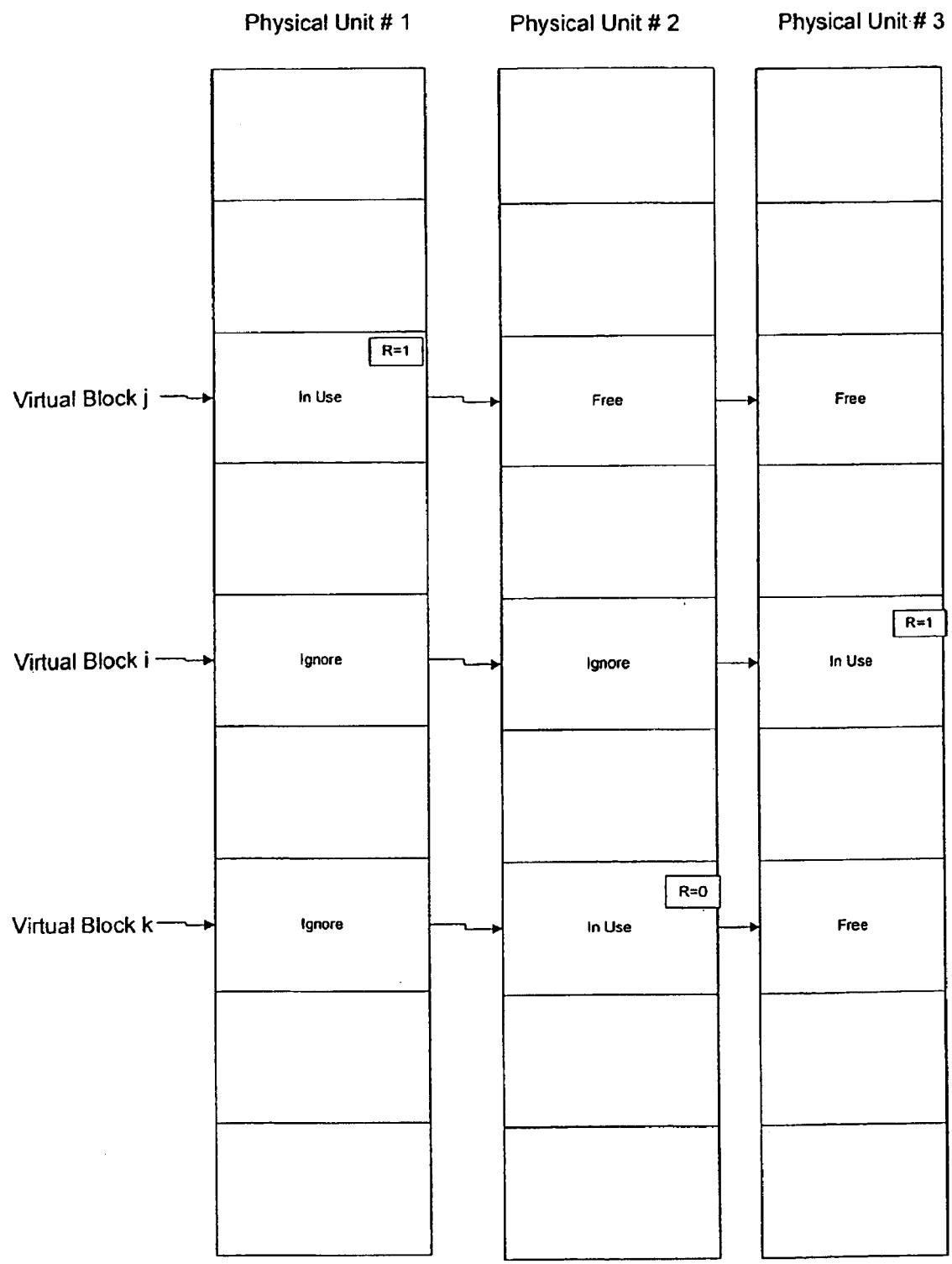

In FIG. 10D the driver state is shown after the driver receives a request to make the current state a new consistent state. As one may recall, this is achieved by the driver by looking for R value changes along the chains, and dropping the blocks left of those change points. The figure shows how this is implemented in this case—each block to be dropped (two blocks in chain "i" and one block in chain "k") gets a state of "Ignored". Such a state means the driver should ignore the existence of the block, so that the end result of the above procedure is that we are left with a new consistent state, reflecting all operations performed so far.

Figure 10E:
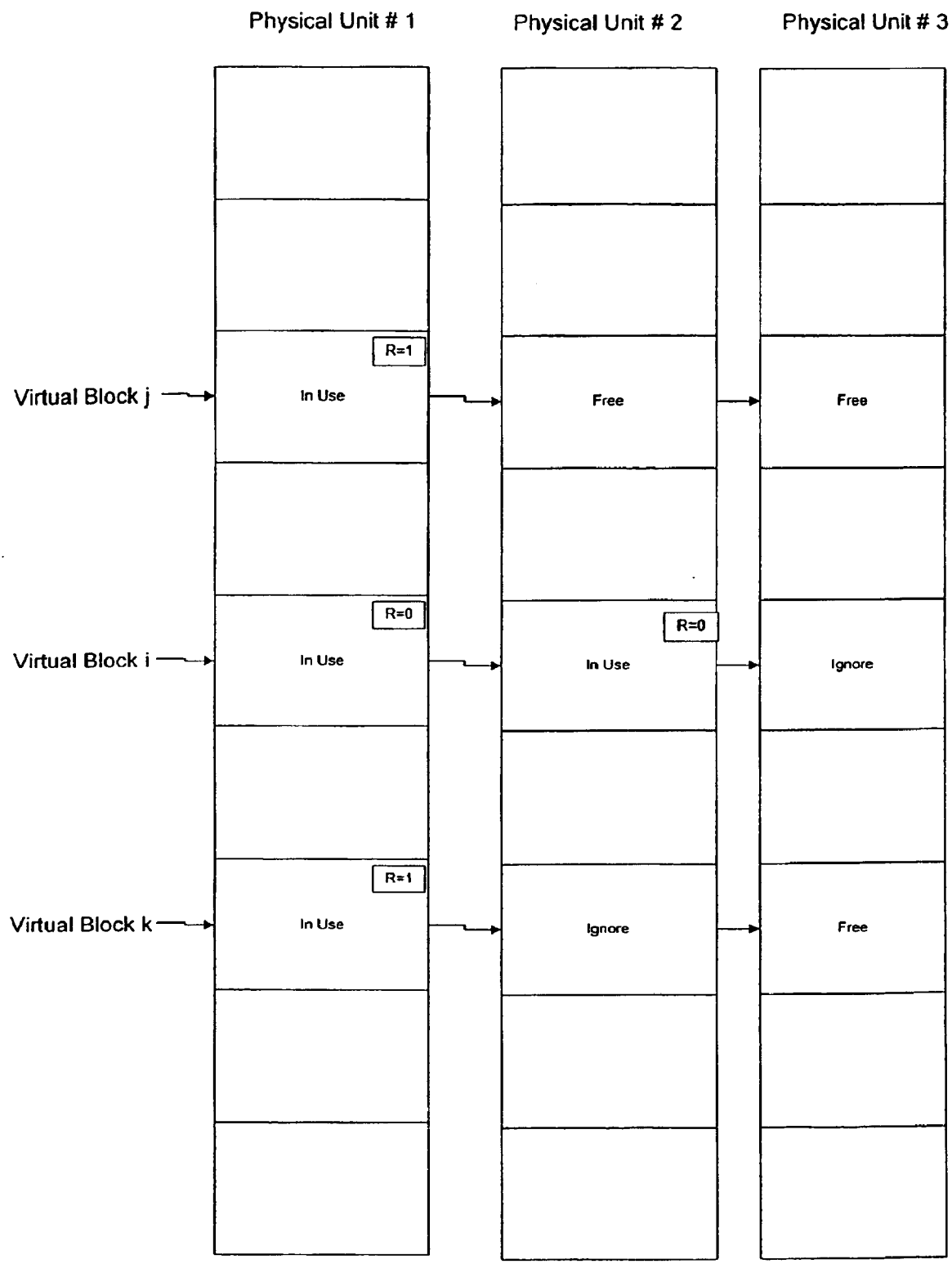

In FIG. 10E the driver state is shown after a recovery from a sudden power loss that occurred prior to the state of FIG. 10D. Again as one may recall, the recovery procedure looks for R value changes along the chains, this time dropping the blocks to the right of the change points. As can be seen in the figure, the blocks to be dropped (one block in chain "i" and one block in chain "k") again get a state of "Ignored". The end result is logically equivalent to the state of FIG. 10A, which is the previous consistent state. Even though there is one more physical unit already allocated in FIG. 10E, from the point of view of the block device user the two figures represent identical states.

As before, a read operation from a virtual block returns the most recent data written into that block, regardless of any consistent point. In other words—the read operations completely ignore the R bits and always return the data at the newest edge of the chain, making sure to ignore each block with an "Ignored" state. If a roll-back occurred as a result of a power loss, the read operation will then return the data belonging to that previous roll-back state, as all newer data is now marked as "Ignored".

As can be seen from the above demonstration, the methods of the current invention are equally applicable to drivers for unit-based media, and consequently all adaptations of the methods to cases of unit-based media are considered to be within the scope of the present invention.

Relative Advantages and Disadvantages of the Embodiments Presented Above:

a. Storage of logical control state information on the storage media:

The first two embodiments are effectively "stateless", in the sense that there is no global (not block-specific) logical control state information written to the storage media when establishing a consistent state, and the driver code does not rely on such information for restoring the media contents during start-up. The third embodiment does not share this feature, as it updates the global "generation" field for each subsequent consistent state. Being stateless makes the driver code simpler and safer, as it is usually the case that the writing of control state information is a vulnerability point in any storage management system, and special measures must be taken for avoiding data corruption in case a power loss occurs when writing such information.

b. Amount of accumulated changes:

If desired, the first embodiment makes it easy to provide for accumulating as many changes to the storage device contents as the full storage contents, and retaining the ability to roll back to a previous consistent state. This can be achieved by making the number of virtual blocks equal to half the number of the available physical blocks. In such a case, there are enough physical blocks to provide each virtual block with an alternate copy, so that in the extreme case, all virtual blocks can be written after a consistent state, and the full contents of the storage device may then still be rolled back to its previous state. This means a driver can be implemented that can accept every possible sequence of commands, without ever returning a "Not Enough Space" response. The other embodiments, which allow for chains longer than two blocks, make achieving such a feature much more difficult.

c. Ability to overwrite in-place:

The first embodiment is applicable only to device drivers which support overwriting blocks in-place. While this is acceptable in magnetic disks, this is not the case in most solid-state memory devices, such as flash memory disks. The other embodiments have no such limitation.

d. Use of chaining:

The first embodiment is applicable only to device drivers that do not use chaining for their normal (non-ruggedized) operation. For if the driver creates a chain longer than one block and then a power loss occurs, on the next start-up the recovery procedure will delete the most recent version of the data and retain the original one, even though the user did not ask for any roll-back to be done. The other embodiments have no such limitation.

e. Amount of effort in establishing a consistent state:

The first two embodiments require the driver to make a "clean-up" of the block chains whenever a new consistent state is defined. This is so because these embodiments require the removal of any trace of previous consistent states, before the new consistent state is "safe" in the sense that the driver will wake-up into it on next power-up. This might be a lengthy operation if many chains have to be cleaned-up, because they all accumulated changes since the previous consistent state. The third embodiment, on the other hand, allows leaving older generation data on the media, and therefore makes the establishment of a new consistent state very fast. This advantage is especially useful when many consistent states are created during a session without taking the system down in-between, a scenario that is very common in most file systems.

f. Support for more than one last consistent state:

As mentioned in the previous point, the third embodiment is unique in that it allows keeping older generation consistent points. This makes it possible to do a roll-back not just to the last consistent state but to some older one. Therefore it is possible to provide the driver's user with a command to roll-back N generations from a current consistent state, after which the driver will decrement its global generation value by N and simulate a power-up sequence which will delete all traces of the last N generations. Nothing like that is possible with the other embodiments.

Ruggedized block device drivers implemented according to the methods of the present invention can be used by higher-level software in several different ways:

1. A new file system may be implemented, or an existing file system may be modified, to take advantage of the ruggedness of the driver in order to provide all application programs with a ruggedized file system. This can easily be done inside the file system software by surrounding each sequence of media access operations that must be atomically completed (i.e. creating a file, adding its directory entry, updating the file allocation tables) with calls to the driver to establish a consistent state. This will assure that we end with either all operations or none completed. This makes the file system operations atomic (as seen by application programs), making it a ruggedized file system.
2. A software application can effectively achieve file system ruggedness even if the file system it is using does not support it and cannot be modified. This can be done by the application surrounding the calls to the file system (i.e. "create file") by commands to the driver to establish a consistent state. In this way, even though the file system is not even aware of its ruggedness property, its operations become atomic. This approach puts the burden on the application programs, but it has a great advantage in that it can be applied to any existing file system without having to modify it, something which is not always possible. Obviously, this approach requires a mechanism for an application to transfer its commands to the driver, but such mechanism is quite commonly available in many existing file systems—for example the IOCTL command available in many systems, which enables the passing of driver-specific commands through the file system to a driver.

It should be noted that some file systems employ buffering techniques, in which case they might not immediately generate all device driver commands upon processing a file system command, thus potentially jeopardizing the atomicity property achieved by the method described above. However, this risk can trivially be eliminated by always issuing a "flush" command to the file system (to copy the contents of the buffers onto the storage media) before sending the command to the driver for establishing a consistent state. This is always possible, as every file system which employs buffering also provides some means for its users to issue some kind of flushing request. Therefore, it should be understood that wherever in the present invention it is specified that a command for establishing a consistent state is sent, it is preceded by a flush command if file system buffering is employed.

3. A software application can give up working with a file system and instead interact directly with the device driver, utilizing its ruggedness to protect its data. This approach, even though possible, is very inconvenient to use and will most probably be used very rarely, if at all.

The foregoing description of the embodiments of the invention has been presented for the purposes of illustration and description. It is not intended to be exhaustive or to limit the invention to the precise form disclosed. It should be appreciated that many modifications and variations are possible in light of the above teaching. It is intended that the scope of the invention be limited not by this detailed description, but rather by the claims appended hereto.

What is claimed is:

1. A method for writing or otherwise changing data in a non-volatile storage device supported by a block device driver so as to provide ruggedized operation, the method comprising the steps of:
   (a) sending a command to the device driver for defining current data contents of the storage device as a fall-back state in case of failure;
   (b) sending a sequence of one or more commands to the device driver, each command potentially changing the data contents of the device; and
   (c) sending a command to the device driver for defining the resulting data contents of the storage device as a new fall-back state in case of failure;
wherein if a failure occurs after step (a) but before the completion of step (c), the device driver rolls back the effects of all said commands issued in step (b) and returns the storage device to contain said data contents defined as a fall-back state in step (a);
and wherein the device driver identifies data associated with said commands conducted after establishing said fall-back state, by establishing chains of physical blocks associated with the driver's virtual blocks, and storing all new data in said physical blocks, such that said new data is stored in said physical blocks that are not the first blocks in said chains of physical blocks.

2. The method of claim 1, in which ruggedness capability of the device driver can be instructed to be turned on or off.

3. A method for writing or otherwise changing data in a unit-based non-volatile storage device supported by a block device driver so as to provide ruggedized operation, the method comprising the steps of:
   (a) sending a command to the device driver for defining current data contents of the storage device as a fall-back state in case of failure;
   (b) sending a sequence of one or more commands to the device driver, each command potentially changing the data contents of the device; and
   (c) sending a command to the device driver for defining the resulting data contents of the storage device as a new fall-back state in case of failure;
   wherein if a failure occurs after step (a) but before the completion of step (c), the device driver rolls back the effects of all said commands issued in step (b) and returns the storage device to contain said data contents defined as a fall-back state step (a); and wherein the device driver identifies data associated with said commands conducted after establishing said fall-back state, by establishing chains of physical blocks associated with the driver's virtual blocks, and storing all new data in said physical blocks, such that said new data is stored in said physical blocks that are not the first blocks in said chains of physical blocks.

4. The method of claim 3, in which ruggedness capability of the device driver can be instructed to be turned on or off.

5. A method for enabling a file system to write or otherwise change data in a non-volatile storage device supported by a ruggedized block device driver, so as to provide ruggedized operation of the file system, the method comprising the steps of:
   (a) optionally examining each command received by said file system, for determining whether said command should be protected from failures; and
   (b) for each said command determined to be protected from failures:
      (i) sending a command to said device driver for defining current data contents of the storage device as a fall-back state in case of failure;

(ii) performing said command received by said file system according to algorithms of said file system, thereby generating at least one command to said device driver, said at least one command potentially changing the data contents of said device; and (iii) sending a command to the device driver for defining said changed data contents of the storage device as a new fall-back state in case of failure.

6. The method of claim 5, in which said ruggedized operation of said file system can be instructed to be turned on or off.

7. A method for converting an existing non-ruggedized file system on a non-volatile storage device supported by a ruggedized block device driver, into a ruggedized file system, the method comprising the steps of:

(a) adding, in the beginning of the file system code implementing each file system command which might change data contents of the storage device, new code for sending a command to the device driver for defining the storage device's current data contents as a fall-back state in case of failure; and (b) adding, at the end of the file system code implementing each file system command which might change said data contents of the storage device, new code for sending a command to the device driver for defining the storage device's current data contents as a fall-back state in case of failure;

wherein, for each said file system command which might change said data contents of the storage device, if a failure occurs after said command to the device driver of step (a) is sent to the device driver but before said sending to the device driver of said command to the device driver of step (b) is completed, the device driver rolls back the effects of said each file system command which might change data contents of the storage device and returns the storage device to contain said data contents defined as a fall-back state by said command to the device driver of step (a);

and wherein, for each said file system command which might change said data contents of the storage device, the device driver identifies data associated with said each file system command which might change said data contents of the storage device, by establishing chains of physical blocks associated with the driver's virtual blocks, and storing all new data in said physical blocks, such that said new data is stored in said physical blocks that are not the first blocks in said chains of physical blocks.

8. The method of claim 7 in which the resulting ruggedized file system is compatible with said existing not ruggedized file system on the same physical device, such that either a physical device operated under said ruggedized file system can be operated under said existing file system, or a physical device operated under said existing file system can be operated under said ruggedized file system, without loss of data when changing between one file system and the other file system.

9. A method for a software application to write or otherwise change data on a non-volatile storage device, where the storage device is supported by a ruggedized block device driver and a file system, so as to provide ruggedized operation of the application, the method comprising the steps of:

(a) sending a command to the device driver for defining the storage device's current data contents as a fall-back state in case of failure;

(b) sending a sequence of at least one command to the file system, each said command potentially changing said data contents of the device; and (c) sending a command to the device driver for defining the resulting data contents of the storage device as a new fall-back state in case of failure;

wherein if a failure occurs after step (a) but before the completion of step (c), the device driver rolls back the effects of all said commands issued in step (b) and returns the storage device to contain said data contents defined as a fall-back state in step (a);

and wherein the device driver identifies data associated with said at least one command conducted after establishing said fall-back state, by establishing chains of physical blocks associated with the drivers virtual blocks, and storing all new data in said physical blocks, such that said new data is stored in said physical blocks that are not the first blocks in said chains of physical blocks.

10. A method for converting an existing non-ruggedized application using a non-volatile storage device supported by a ruggedized block device driver and a file system, into a ruggedized application, the method comprising the steps of:

adding, before code sending any sequence of commands to the file system which might change the file system's data contents, new code for sending a command to the device driver, which defines current data contents of the storage device as a fall-back state in case of failure; and adding, after said code sending any sequence of commands to the file system which might change the file system's data contents, new code for sending a command to the device driver, which defines current data contents of the storage device as a fall-back state in case of failure;

wherein, for each said code sending any sequence of commands to the file system which might change the file system's data contents, if a failure occurs after said command to the device driver of step (a) is sent to the device driver but before said sending to the device driver of said command to the device driver of step (b) is completed, the device driver rolls back the effects of said each code sending any sequence of commands to the file system which might change the file system's data contents and returns the storage device to contain said data contents defined as a fall-back state by said command to the device driver of step (a);

and wherein, for each said code sending any sequence of commands to the file system which might change the file system's data contents, the device driver identifies data associated with said each code sending any sequence of commands to the file system which might change the file system's data contents, by establishing chains or physical blocks associated with the driver's virtual blocks, and storing all new data in said physical blocks, such that said new data is stored in said physical blocks that are not the first blocks in said chains of physical blocks.

11. A system providing ruggedized operation of a non-volatile storage device, comprising:

(a) physical non-volatile storage media; and (b) a software block device driver which is ruggedized by itself, independently of a file system or other software application using it;

wherein said device driver identifies data associated with new operations conducted after establishing a fall-back state, by establishing chains of physical blocks associated with the driver's virtual blocks, such that all such new data is stored in said blocks which are not the first blocks in said chains.

12. The system of claim 11, in which said physical non-volatile storage media is unit-based media.

13. The system of claim 11, in which ruggedness capability of said ruggedized device driver can be instructed to be turned on or off.

14. A system providing ruggedized operation of a file system on a non-volatile storage device, comprising the following:

(a) physical non-volatile storage media;

(b) a software block device driver for operating said storage media, said device driver being ruggedized by itself, independently of the file system or other software applications using it; and (c) a ruggedized file system wherein ruggedness of said file system is achieved by using the ruggedized features of said block device driver;

wherein said device driver identifies data associated with new operations conducted after establishing a fall-back state, by establishing chains of physical blocks associated with the driver's virtual blocks, such that all such new data is stored in said blocks which are not the first blocks in said chains.

15. The system of claim 14, wherein said ruggedized file system is compatible with at least one non-ruggedized file system on the same physical device, such that either a physical device operated under said ruggedized file system can be operated under said non-ruggedized file system, or a physical device operated under said non-ruggedized file system can be operated under said ruggedized file system, without loss of data when changing from one file system to the other file system.

16. The system of claim 14, in which ruggedness capability of said ruggedized file system can be instructed to be turned on or off.

17. A system providing ruggedized operation of a software application on a non-volatile storage device, comprising the following:

(a) physical non-volatile storage media;

(b) a software block device driver for operating said storage media, said device driver being ruggedized by itself, independently of the file system or other software applications using it;

(c) a file system; and (d) a software application, such that ruggedness of said application is achieved by using ruggedized features of said block device driver;

wherein said device driver identifies data associated with new operations conducted after establishing a fall-back state, by establishing chains of physical blocks associated with the driver's virtual blocks, such that all such new data is stored in said blocks which are not the first blocks in said chains.

18. A method for writing or otherwise changing data in a non-volatile storage device supported by a block device driver so as to provide ruggedized operation, the method comprising the steps of:

(a) sending a command to the device driver for defining current data contents of the storage device as a fall-back state in case of failure;

(b) sending a sequence of one or more commands to the device driver, each command potentially changing the data contents of the device; and (c) sending a command to the device driver for defining the resulting data contents of the storage device as a new fall-back state in case of failure;

wherein if a failure occurs after step (a) but before the completion of step (c), the device driver rolls back the effects of all said commands issued in step (b) and returns the storage device to contain said data contents defined as a fall-back state in step (a);

and wherein the device driver identifies data associated with said commands conducted after establishing said fall-back state, by associating a ruggedness field with each physical block and detecting changes in the value of said ruggedness field along chains of physical blocks associated with the driver's virtual blocks, such that all new data is in blocks which are positioned after points of said changes.

19. A method for writing or otherwise changing data in a unit-based non-volatile storage device supported by a block device driver so as to provide ruggedized operation, the method comprising the steps of:

(a) sending a command to the device driver for defining current data contents of the storage device as a fall-back state in case of failure;

(b) sending a sequence of one or more commands to the device driver, each command potentially changing the data contents of the device; and (c) sending a command to the device driver for defining the resisting data contents of the storage device as a new fall-back state in case of failure;

wherein if a failure occurs after step (a) but before the completion of step (c), the device driver rolls back the effects of all said commands issued in step (b) and returns the storage device to contain said data contents defined as a fall-back state in step (a);

and wherein the device driver identifies data associated with said commands conducted after establishing said fall-back state, by associating a ruggedness field with each physical block and detecting changes in the value of said ruggedness field along chains of physical blocks associated with the driver's virtual blocks, such that all new data is in blocks which are positioned after points of said changes.

20. A method for converting an existing non-ruggedized file system on a non-volatile storage device supported by a ruggedized block device driver, into a ruggedized file system, the method comprising the steps of:

(a) adding, in the beginning of the file system code implementing each file system command which might change data contents of the storage device, new code for sending a command to the device driver for defining the storage device's current data contents as a fall-back state in case of failure; and (b) adding, at the end of the file system code implementing each file system command which might change said data contents of the storage device, new code for sending a command to the device driver for defining the storage device's current data contents as a fall-back state in case of failure;

wherein, for each said file system command which might change said data contents of the storage device, if a failure occurs after said command to the device driver of step (a) is sent to the device driver but before said sending to the device driver of said command to the device driver of step (b) is completed, the device driver rolls back the effects of said each file system command which might change data contents of the storage device and returns the storage device to contain said data contents defined as a fall-back state by said command to the device driver of step (a);

and wherein, for each said file system command which might change said data contents of the storage device, the device driver identifies data associated with said each file system command which might change said data contents of the storage device, by associating a ruggedness field with each physical block and detecting changes in the value of said ruggedness field along chains of physical blocks associated with the driver's virtual blocks, such that all new data is in blocks which are positioned after points of said changes.

21. A method for a software application to write or otherwise change data on a non-volatile storage device, where the storage device is supported by a ruggedized block device driver and a file system, so as to provide ruggedized operation of the application, the method comprising the steps of:

(a) sending a command to the device driver for defining the storage device's current data contents as a fall-back state in case of failure;

(b) sending a sequence of at least one command to the file system, each said command potentially changing said data contents of the device; and (c) sending a command to the device driver for defining the resulting data contents of the storage device as a new fall-back state in case of failure;

wherein if a failure occurs after step (a) but before the completion of step (c), the device driver rolls back the effects of all said commands issued in step (b) and returns the storage device to contain said data contents defined as a fall-back state in step (a);

and wherein the device driver identifies data associated with said at least one command conducted after establishing said fall-back state, by associating a ruggedness field with each physical block and detecting changes in the value of said ruggedness field along chains of physical blocks associated with the driver's virtual blocks, such that all new data is in blocks which are positioned after points of said changes.

22. A method for converting an existing non-ruggedized application using a non-volatile storage device supported by a ruggedized block device driver and a file system, into a ruggedized application, the method comprising the steps of:

(a) adding, before code sending any sequence of commands to the file system which might change the file system's data contents, new code for sending a command to the device driver, which defines current data contents of the storage device as a fall-back state in case of failure; and (b) adding, after said code sending any sequence of commands to the file system which might change the file system's data contents, new code for sending a command to the device driver, which defines current data contents of the storage device as a fall-back state in case of failure;

wherein, for each said code sending any sequence of commands to the file system which might change the file system's data contents, if a failure occurs after said command to the device driver of step (a) is sent to the device driver but before said sending to the device driver of said command to the device driver of step (b) is completed, the device driver rolls back the effects of said each code sending any sequence of commands to the file system which might change the file system's data contents and returns the storage device to contain said data contents defined as a fall-back state by said command to the device driver of step (a);

and wherein, for each said code sending any sequence of commands to the file system which might change the file system's data contents, the device driver identifies data associated with said each code sending any sequence of commands to the file system which might change the file system's data contents, by associating a ruggedness field with each physical block and detecting changes in the value of said ruggedness field along chains of physical blocks associated with the driver's virtual blocks, such that all new data is in blocks which are positioned after points of said changes.

23. A system providing ruggedized operation of a non-volatile storage device, comprising:

(a) physical non-volatile storage media; and (b) a software block device driver which is ruggedized by itself, independently of a file system or other software application using it;

wherein said device driver identifies the data associated with new operations conducted after establishing a fall-back state, by associating a ruggedness field with each physical block and detecting changes in the value of said ruggedness field along the chains of physical blocks associated with the driver's virtual blocks, such that all new data is in blocks which are positioned after said points of change.

24. A system providing ruggedized operation of a file system on a non-volatile storage device, comprising the following:

(a) physical non-volatile storage media;

(b) a software block device driver for operating said storage media, said device driver being ruggedized by itself, independently of the file system or other software applications using it; and (c) a ruggedized file system wherein ruggedness of said file system is achieved by using the ruggedized features of said block device driver;

wherein said device driver identifies the data associated with new operations conducted after establishing a fall-back state, by associating a ruggedness field with each physical block and detecting changes in the value of said ruggedness field along the chains of physical blocks associated with the driver's virtual blocks, such that all new data is in blocks which are positioned after said points of change.

25. A system providing ruggedized operation of a software application on a non-volatile storage device, comprising the following:

(a) physical non-volatile storage media;

(b) a software block device driver for operating said storage media, said device driver being ruggedized by itself, independently of the file system or other software applications using it;

(c) a file system; and (d) a software application, such that ruggedness of said application is achieved by using ruggedized features of said block device driver wherein said device driver identifies the data associated with new operations conducted after establishing a fall-back state, by associating a ruggedness field with each physical block and detecting changes in the value of said ruggedness field along the chains of physical blocks associated with the driver's virtual blocks, such that all new data is in blocks which are positioned after said points of change.

26. A method for writing or otherwise changing data in a non-volatile storage device supported by a block device driver so as to provide ruggedized operation, the method comprising the steps of:

(a) sending a command to the device driver for defining current data contents of the storage device as a fall-back state in case of failure;

(b) sending a sequence of one or more commands to the device driver, each command potentially changing the data contents of the device; and (c) sending a command to the device driver for defining the resulting data contents of the storage device as a new fall-back state in case of failure;

wherein if a failure occurs after step (a) but before the completion of step (c), the device driver rolls back the effects of all said commands issued in step (b) and returns the storage device to contain said data contents defined as a fall-back state in step (a);

and wherein the device driver identifies data associated with said commands conducted after establishing said fall-back state, by associating a generation field with each physical block and maintaining a global generation state, such that all new data is in blocks whose generation field equals said global generation value.

27. A method for writing or otherwise changing data in a unit-based non-volatile storage device supported by a block device driver so as to provide ruggedized operation, the method comprising the steps of:
   (a) sending a command to the device driver for defining current data contents of the storage device as a fall-back state in case of failure;
   (b) sending a sequence of one or more commands to the device driver, each command potentially changing the data contents of the device; and
   (c) sending a command to the device driver for defining the resulting data contents of the storage device as a new fall-back state in case of failure;
wherein if a failure occurs after step (a) but before the completion of step (c), the device driver rolls back the effects of all said commands issued in step (b) and returns the storage device to contain said data contents defined as a fall-back state in step (a);
and wherein the device driver identifies data associated with said commands conducted after establishing said fall-back state, by associating a generation field with each physical block and maintaining a global generation state, such that all new data is in blocks whose generation field equals said global generation value.

28. A method for converting an existing non-ruggedized file system on a non-volatile storage device supported by a ruggedized block device driver, into a ruggedized file system, the method comprising the steps of:
   (a) adding, in the beginning of the file system code implementing each file system command which might change data contents of the storage device, new code for sending a command to the device driver for defining the storage device's current data contents as a fall-back state in case of failure; and
   (b) adding, at the end of the file system code implementing each file system command which might change said data contents of the storage device, new code for sending a command to the device driver for defining the storage device's current data contents as a fall-back state in case of failure;
wherein, for each said file system command which might change said data contents of the storage device, if a failure occurs after said command to the device driver of step (a) is sent to the device driver but before said sending to the device driver of said command to the device driver of step (b) is completed, the device driver rolls back the effects of said each file system command which might change data contents of the storage device and returns the storage device to contain said data contents defined as a fall-back state by said command to the device driver of step (a)
and wherein, for each said file system command which might change said data contents of the storage device, the device driver identifies data associated with said each file system command which might change said data contents of the storage device, by associating a generation field with each physical block and maintaining a global generation state, such that all new data is in blocks whose generation field equals said global generation value.

29. A method for a software application to write or otherwise change data on a non-volatile storage device, where the storage device is supported by a ruggedized block device driver and a file system, so as to provide ruggedized operation of the application, the method comprising the steps of:
   (a) sending a command to the device driver for defining the storage device's current data contents as a fall-back state in case of failure;
   (b) sending a sequence of at least one command to the file system, each said command potentially changing said data contents of the device; and
   (c) sending a command to the device driver for defining the resulting data contents of the storage device as a new fall-back state in case of failure;
wherein if a failure occurs after step (a) but before the completion of step (c), the device driver rolls back the effects of all said commands issued in step (b) and returns the storage device to contain said data contents defined as a fall-back state in step (a);
and wherein the device driver identifies data associated with said commands conducted after establishing said fall-back state, by associating a generation field with each physical block and maintaining a global generation state, such that all new data is in blocks whose generation field equals said global generation value.

30. A method for converting an existing non-ruggedized application using a non-volatile storage device supported by a ruggedized block device driver and a file system, into a ruggedized application, the method comprising the steps of:
   (a) adding, before code sending any sequence of commands to the file system which might change the file system's data contents, new code for sending a command to the device driver, which defines current data contents of the storage device as a fall-back state in case of failure; and
   (b) adding, after said code sending any sequence of commands to the file system which might change the file system's data contents, new code for sending a command to the device driver, which defines current data contents of the storage device as a fall-back state in case of failure;
wherein, for each said code sending any sequence of commands to the file system which might change the file system's data contents, if a failure occurs after said command to the device driver of step (a) is sent to the device driver but before said sending to the device driver of said command to the device driver of step (b) is completed, the device driver rolls back the effects of said each code sending any sequence of commands to the file system which might change the file system's data contents and returns the storage device to contain said data contents defined as a fall-back state by said command to the device driver of step (a);
and wherein, for each said code sending any sequence of commands to the file system which might change the file system's data contents, the device driver identifies data associated with said each code sending any sequence of commands to the file system which might change the file system's data contents, by associating a generation field with each physical block and maintaining a global generation state, such that all new data is in blocks whose generation field equals said global generation value.

31. A system providing ruggedized operation of a non-volatile storage device, comprising:
   (a) physical non-volatile storage media; and
   (b) a software block device driver which is ruggedized by itself, independently of a file system or other software application using it;

wherein said device driver identifies the data associated with new operations conducted after establishing a fall-back state, by associating a generation field with each physical block and maintaining a global generation state, such that all new data is in blocks whose generation field equals the global generation value.

32. A system providing ruggedized operation of a file system on a non-volatile storage device, comprising the following:
(a) physical non-volatile storage media;
(b) a software block device driver for operating said storage media, said device driver being ruggedized by itself, independently of the file system or other software applications using it; and
(c) a ruggedized file system wherein ruggedness of said file system is achieved by using the ruggedized features of said block device driver, wherein said device driver identifies the data associated with new operations conducted after establishing a fall-back state, by associating a generation field with each physical block and maintaining a global generation state, such that all new data is in blocks whose generation field equals the global generation value.

33. A system providing ruggedized operation of a software application on a non-volatile storage device, comprising the following:
(a) physical non-volatile storage media;
(b) a software block device driver for operating said storage media, said device driver being ruggedized by itself, independently of the file system or other software applications using it;
(c) a file system; and
(d) a software application, such that ruggedness of said application is achieved by using ruggedized features of said block device driver, wherein said device driver identifies the data associated with new operations conducted after establishing a fall-back state, by associating a generation field with each physical block and maintaining a global generation state, such that all new data is in blocks whose generation field equals the global generation value.

34. A method for writing or otherwise changing data in a non-volatile storage device supported by a block device driver so as to provide ruggedized operation, the method comprising the steps of:
(a) adding, to the device driver, only:
    (i) a first command for defining current data contents of the storage device as a fall-back state in case of failure, and
    (ii) a second command for defining current data contents of the storage device as a new consistent state;
(b) sending said first command to the device driver;
(c) sending to the device driver a sequence of one or more commands that potentially change the data contents of the device; and
(d) sending said second command to the device driver.

35. The method of claim 34, wherein if a failure occurs after step (b) but before the completion of step (d), the device driver rolls back the effects of all said commands issued in step (c) and returns the storage device to contain said data contents defined as a fall-back state in step (b).

36. The method of claim 35 in which the device driver identifies data associated with said commands conducted after establishing said fall-back state, by establishing chains of physical blocks associated with the driver's virtual blocks, and storing all new data in said physical blocks, such that said new data is stored in said physical blocks that are not the first blocks in said chains of physical blocks.

37. The method of claim 35 in which the device driver identifies data associated with said commands conducted after establishing said fall-back state, by associating a ruggedness field with each physical block and detecting changes in the value of said ruggedness field along chains of physical blocks associated with the driver's virtual blocks, such that all new data is in blocks which are positioned after points of said changes.

38. The method of claim 35, in which the device driver identifies data associated with said commands conducted after establishing said fall-back state, by associating a generation field with each physical block and maintaining a global generation state, such that all new data is in blocks whose generation field equals said global generation value.

39. The method of claim 34, in which ruggedness capability of the device driver can be instructed to be turned on or off.

40. A method for writing or otherwise changing data in a unit-based non-volatile storage device supported by a block device driver so as to provide ruggedized operation, the method comprising the steps of:
(a) adding, to the device driver, only:
    (i) a first command for defining current data contents of the storage device as a fall-back state in case of failure, and
    (ii) a second command for defining current data contents of the storage device as a new consistent state;
(b) sending said first command to the device driver;
(c) sending to the device driver a sequence of one or more commands that potentially change the data contents of the device; and
(d) sending said second command to the device driver.

41. The method of claim 40, wherein if a failure occurs after step (b) but before the completion of step (d), the device driver rolls back the effects of all said commands issued in step (c) and returns the storage device to contain said data contents defined as a fall-back state in step (b).

42. The method of claim 41 in which the device driver identifies data associated with said commands conducted after establishing said fall-back state, by establishing chains of physical blocks associated with the driver's virtual blocks, and storing all new data in said physical blocks, such that said new data is stored in said physical blocks that are not the first blocks in said chains of physical blocks.

43. The method of claim 41 in which the device driver identifies data associated with said commands conducted after establishing said fall-back state, by associating a ruggedness field with each physical block and detecting changes in the value of said ruggedness field along chains of physical blocks associated with the driver's virtual blocks, such that all new data is in blocks which are positioned after points of said changes.

44. The method of claim 41 in which the device driver identifies data associated with said commands conducted after establishing said fall-back state, by associating a generation field with each physical block and maintaining a global generation state, such that all new data is in blocks whose generation field equals said global generation value.

45. The method of claim 40, in which ruggedness capability of the device driver can be instructed to be turned on or off.

46. A method for enabling a file system to write or otherwise change data in a non-volatile storage device supported by a block device driver, so as to provide ruggedized operation of the file system, the method comprising the steps of:

(a) adding, to the device driver, only:
   (i) a first command for defining current data contents of the storage device as a fall-back state in case of failure, and
   (ii) a second command for defining current data contents of the storage device as a new consistent state;
(b) optionally examining each command received by the file system, for determining whether said command should be protected from failures; and
(c) for each said command determined to be protected from failures:
   (i) sending said first command to said device driver, by the file system;
   (ii) performing said command received by said file system according to algorithms of said file system, thereby generating a sequence of at least one command to said device driver that potentially changes the data content of the device; and
   (iii) sending said second command to the device driver, by the file system.

47. The method of claim 46, in which said ruggedized operation of said file system can be instructed to be turned on or off.

48. A method for converting an existing non-ruggedized file system on a non-volatile storage device supported by a block device driver, into a ruggedized file system, the method comprising the steps of:
(a) adding, to the device driver, only:
   (i) a first command for defining current data contents of the storage device as a fall-back state in case of failure, and
   (ii) a second command for defining current data contents of the storage device as a new consistent state;
(b) adding, in the beginning of the file system code implementing each file system command which might change data contents of the storage device, new code for sending said first command to the device driver; and
(c) adding, at the end of the file system code implementing each file system command which might change said data contents of the storage device, new code for sending said second command to the device driver.

49. The method of claim 48 in which the resulting ruggedized file system is compatible with said existing not ruggedized file system on the same physical device, such that either a physical device operated under said ruggedized file system can be operated under said existing file system, or a physical device operated under said existing file system can be operated under said ruggedized file system, without loss of data when changing between one file system and the other file system.

50. A method for a software application to write or otherwise change data on a non-volatile storage device, where the storage device is supported by a block device driver and a file system, so as to provide ruggedized operation of the application, the method comprising the steps of:
(a) adding, to the the device driver, only:
   (i) a first command for defining current data contents of the storage device as a fall-back state in case of failure, and
   (ii) a second command for defining current data contents of the storage device as a new consistent state;
(b) sending, by the software application, said first command to the device driver;
(c) sending, by the software application, a sequence of at least one command to the file system, each said command potentially changing said data contents of the device; and
(d) sending, by the software application, said second command to the device driver.

51. A method for converting an existing non-ruggedized application using a non-volatile storage device supported by a block device driver and a file system, into a ruggedized application, the method comprising the steps of:
(a) adding, to the the device driver, only:
   (i) a first command for defining current data contents of the storage device as a fall-back state in case of failure, and
   (ii) a second command for defining current data contents of the storage device as a new consistent state;
(b) adding, before code sending any sequence of commands to the file system which might change the file system's data contents, new code for sending said first command to the device driver; and
(c) adding, after said code sending any sequence of commands to the file system which might change the file system's data contents, new code for sending said second command to the device driver.

52. A system providing ruggedized operation of a non-volatile storage device, comprising:
(a) physical non-volatile storage media; and
(b) a software block device driver which is ruggedized by itself, independently of a file system or other software application using it, by supporting a set of commands that includes only:
   (i) a first command for defining current data contents of the storage media as a fall-back state in case of failure,
   (ii) a second command for defining current data contents of the storage media as a new consistent state, and
   (iii) commands supported by a corresponding non-ruggedized software block device driver.

53. The system of claim 52, in which said physical non-volatile storage media is unit-based media.

54. The system of claim 52, in which said device driver identifies data associated with new operations conducted after establishing a fall-back state, by establishing chains of physical blocks associated with the driver's virtual blocks, such that all such new data is stored in said blocks which are not the first blocks in said chains.

55. The system of claim 52, in which said device driver identifies the data associated with new operations conducted after establishing a fall-back state, by associating a ruggedness field with each physical block and detecting changes in the value of said ruggedness field along the chains of physical blocks associated with the driver's virtual blocks, such that all new data is in blocks which are positioned after said points of change.

56. The system of claim 52, in which said device driver identifies the data associated with new operations conducted after establishing a fall-back state, by associating a generation field with each physical block and maintaining a global generation state, such that all new data is in blocks whose generation field equals the global generation value.

57. The system of claim 52, in which ruggedness capability of said ruggedized device driver can be instructed to be turned on or off.

58. A system providing ruggedized operation of a file system on a non-volatile storage device, comprising the following:
(a) physical non-volatile storage media;
(b) a software block device driver for operating said storage media, said device driver being ruggedized by itself, independently of the file system or other software applications using it, by supporting a set of commands that includes only:
  (i) a first command for defining current data contents of the storage media as a fall-back state in case of failure,
  (ii) a second command for defining current data contents of the storage media as a new consistent state, and
  (iii) commands supported by a corresponding non-ruggedized software block device driver, and
(c) a ruggedized file system wherein ruggedness of said file system is achieved by using the ruggedized features of said block device driver.

59. The system of claim 58, wherein said ruggedized file system is compatible with at least one non-ruggedized file system on the same physical device, such that either a physical device operated under said ruggedized file system can be operated under said non-ruggedized file system, or a physical device operated under said non-ruggedized file system can be operated under said ruggedized file system, without loss of data when changing from one file system to the other file system.

60. The system of claim 58, in which ruggedness capability of said ruggedized file system can be instructed to be turned on or off.

61. A system providing ruggedized operation of a software application on a non-volatile storage device, comprising the following:
(a) physical non-volatile storage media;
(b) a software block device driver for operating said storage media, said device driver being ruggedized by itself, independently of the file system or other software applications using it by supporting a set of commands that includes only:
  (i) a first command for defining current data contents of the storage media as a fall-back state in case of failure,
  (ii) a second command for defining current data contents of the storage media as a new consistent state, and
  (iii) commands supported by a corresponding non-ruggedized software block device driver;
(c) a file system; and
(d) a software application, such that ruggedness of said application is achieved by using ruggedized features of said block device driver.

* * * * *